US012775102B2

(12) United States Patent
Aravapalli et al.

(10) Patent No.: US 12,775,102 B2
(45) Date of Patent: Oct. 27, 2026

(54) DIFFERENTIAL GLOBAL NAVIGATION SATELLITE SYSTEM (DGNSS) ENHANCEMENT

(71) Applicant: QUALCOMM Incorporated, San Diego, CA (US)

(72) Inventors: Naveen Kumar Aravapalli, Hyderabad (IN); Arun Kumar Sharma Tandra, Hyderabad (IN); Chandrasekhar Jayaram, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 18/682,083

(22) PCT Filed: Sep. 2, 2022

(86) PCT No.: PCT/US2022/042557
§ 371 (c)(1),
(2) Date: Feb. 7, 2024

(87) PCT Pub. No.: WO2023/055535
PCT Pub. Date: Apr. 6, 2023

(65) Prior Publication Data
US 2024/0337759 A1 Oct. 10, 2024

(30) Foreign Application Priority Data
Sep. 29, 2021 (IN) ............................ 202141044235

(51) Int. Cl.
*G01S 19/41* (2010.01)
*G01S 19/07* (2010.01)

(52) U.S. Cl.
CPC ........... *G01S 19/41* (2013.01); *G01S 19/071* (2019.08)

(58) Field of Classification Search
CPC ............................................. G01S 19/07–074
See application file for complete search history.

(56) References Cited

U.S. PATENT DOCUMENTS 6,067,484 A * 5/2000 Rowson ............... G05D 1/0676 701/16
2007/0236388 A1* 10/2007 Fiedelak ............... G01S 19/074 342/357.44

(Continued)

FOREIGN PATENT DOCUMENTS

| | | | |
|---|---|---|---|
| CN | 108490464 | A | 9/2018 |
| EP | 1857830 | B1 | 7/2013 |
| TW | 202101029 | A | 1/2021 |

OTHER PUBLICATIONS

International Search Report and Written Opinion—PCT/US2022/042557—ISA/EPO—Jul. 18, 2023.

(Continued)

*Primary Examiner* — Cassi J Galt
(74) *Attorney, Agent, or Firm* — Thien T. Nguyen

(57) ABSTRACT

A terminal position is determined with differential Global Navigation Satellite System (DGNSS) using GNSS signals from a plurality of satellite vehicles and differential corrections generated by a reference station for the GNSS signals and broadcast via a DGNSS server. The use of the differential corrections for positioning is interrupted when the determined terminal position does not improve with use of the differential corrections. The differential corrections may be interrupted for a period of time so that the terminal no longer receives the broadcast of the differential corrections or so that the differential corrections are not used for position estimation in order to reduce power consumption and reduce processing operations. The DGNSS capabilities of the terminal, such as the supported GNSS constellations and/or (Continued)

frequency bands, may be used by the DGNSS server to select differential corrections to broadcast to the terminal.

52 Claims, 11 Drawing Sheets

(56) References Cited

U.S. PATENT DOCUMENTS

| | | | |
|---|---|---|---|
| 2012/0062416 | A1 | 3/2012 | Syrjarinne et al. |
| 2017/0045624 | A1 | 2/2017 | Drescher et al. |
| 2017/0227648 | A1* | 8/2017 | Johnson ................ G01S 19/072 |
| 2020/0169831 | A1 | 5/2020 | Li et al. |

OTHER PUBLICATIONS

Partial International Search Report—PCT/US2022/042557—ISA/EPO—Feb. 22, 2023.
Taiwan Search Report—TW111133537—TIPO—May 18, 2026.

* cited by examiner

DIFFERENTIAL GLOBAL NAVIGATION SATELLITE SYSTEM (DGNSS) ENHANCEMENT

CROSS REFERENCE TO RELATED APPLICATIONS

This application is a National Stage Application filed under 35 U.S.C. § 371 of PCT International Application Serial No. PCT/US2022/042557 entitled "DIFFERENTIAL GLOBAL NAVIGATION SATELLITE SYSTEM DGNSS) ENHANCEMENT" and filed on Sep. 2, 2022, which claims the benefit of Indian Application No. 202141044235, entitled "SYSTEMS AND METHODS FOR DIFFERENTIAL GLOBAL NAVIGATION SATELLITE SYSTEM (DGNSS) ENHANCEMENT" and filed on Sep. 29, 2021, which are expressly incorporated by reference herein in their entirety.

TECHNICAL FIELD

The subject matter disclosed herein relates generally to the field of wireless communications, and more specifically to techniques for supporting positioning.

INTRODUCTION

It is often desirable, and sometimes necessary, to know the location of a terminal, e.g., a cellular phone. The terms "location" and "position" are synonymous and are used interchangeably herein. For example, a location services (LCS) client may desire to know the location of the terminal and may communicate with a location center in order to request the location of the terminal. The location center and the terminal may then exchange messages, as necessary, to obtain a location estimate for the terminal. The location center may then return the location estimate to the LCS client.

The location of the terminal may be estimated based on pseudo-ranges for a sufficient number of satellites in a global navigation satellite system (GNSS) and the known locations of the satellites. The pseudo-ranges for the satellites may be determined by the terminal based on signals transmitted by the satellites. The pseudo-ranges may have errors due to various sources such as (i) propagation delays of the satellite signals through the ionosphere and troposphere, (ii) errors in ephemeris data describing the locations and velocities of the satellites, (iii) clock drift on the satellites, and/or (iv) pseudo-random errors deliberately introduced in the satellite signals via a process referred to as selective availability (SA). The errors in the pseudo-ranges result in limited positioning accuracy.

Accuracy in GNSS systems may be enhanced using differential GNSS (DGNSS) in which measurements from a primary GNSS system are corrected using differential information provided by an accurately surveyed reference station. The reference station, for example, broadcasts corrections to the GNSS position or the pseudo-range measurements, which is received by a mobile device and used along with its own GNSS measurements to generate a relatively accurate position for the mobile device.

While DGNSS provides improved positioning accuracy, the DGNSS process is power and computationally intensive. Thus, improvements in the positioning operations for DGNSS may be desired.

BRIEF SUMMARY

A terminal position is determined with differential Global Navigation Satellite System (DGNSS) using GNSS signals from a plurality of satellite vehicles and differential corrections generated by a reference station for the GNSS signals and broadcast via a DGNSS server. The use of the differential corrections for positioning is interrupted when the determined terminal position does not improve with use of the differential corrections. The differential corrections may be interrupted for a period of time so that the terminal no longer receives the broadcast of the differential corrections or so that the differential corrections are not used for position estimation in order to reduce power consumption and reduce processing operations. The DGNSS capabilities of the terminal, such as the supported GNSS constellations and/or frequency bands, may be used by the DGNSS server to select differential corrections to broadcast to the terminal.

In one implementation, a method performed by a terminal for positioning, the method includes wirelessly connecting with a differential Global Navigation Satellite System (DGNSS) server to receive differential corrections generated by a reference station for GNSS signals; receiving GNSS signals from a plurality of GNSS satellite vehicles; receiving the differential corrections generated by the reference station that are broadcast by the DGNSS server; determining whether a position estimate for the terminal will be improved using the GNSS signals and the differential corrections relative to using the GNSS signals without the differential corrections; determining a position for the terminal based on the GNSS signals and the differential corrections in response to a determination that the position estimate for the terminal will be improved; and stopping the use of differential corrections broadcast by the DGNSS server and determining the position for the terminal based on the GNSS signals without the differential corrections in response to a determination that the position estimate for the terminal will not be improved.

In one implementation, a terminal configured for positioning, includes a wireless transceiver configured to wirelessly communicate with entities in a wireless network; a Global Navigation Satellite System (GNSS) receiver; at least one memory; at least one processor coupled to the wireless transceiver, the GNSS receiver and the at least one memory, wherein the at least one processor is configured to: wirelessly connect, via the wireless transceiver, with a differential Global Navigation Satellite System (DGNSS) server to receive differential corrections generated by a reference station for GNSS signals; receive, via the GNSS receiver, GNSS signals from a plurality of GNSS satellite vehicles; receive, via the wireless transceiver, the differential corrections generated by the reference station that are broadcast by the DGNSS server; determine whether a position estimate for the terminal will be improved using the GNSS signals and the differential corrections relative to using the GNSS signals without the differential corrections; determine a position for the terminal based on the GNSS signals and the differential corrections in response to a determination that the position estimate for the terminal will be improved; and stop the use of differential corrections broadcast by the DGNSS server and determining the position for the terminal based on the GNSS signals without the differential corrections in response to a determination that the position estimate for the terminal will not be improved.

In one implementation, a terminal configured for positioning, includes means for wirelessly connecting with a differential Global Navigation Satellite System (DGNSS) server to receive differential corrections generated by a reference station for GNSS signals; means for receiving GNSS signals from a plurality of GNSS satellite vehicles; means for receiving the differential corrections generated by the reference station that are broadcast by the DGNSS server; means for determining whether a position estimate for the terminal will be improved using the GNSS signals and the differential corrections relative to using the GNSS signals without the differential corrections; means for determining a position for the terminal based on the GNSS signals and the differential corrections in response to a determination that the position estimate for the terminal will be improved; and means for stopping the use of differential corrections broadcast by the DGNSS server and determining the position for the terminal based on the GNSS signals without the differential corrections in response to a determination that the position estimate for the terminal will not be improved.

In one implementation, a non-transitory computer readable storage medium including program code stored thereon, the program code is operable to configure at least one processor in a terminal for positioning, the program code comprising instructions to: wirelessly connect with a differential Global Navigation Satellite System (DGNSS) server to receive differential corrections generated by a reference station for GNSS signals; receive GNSS signals from a plurality of GNSS satellite vehicles; receive the differential corrections generated by the reference station that are broadcast by the DGNSS server; determine whether a position estimate for the terminal will be improved using the GNSS signals and the differential corrections relative to using the GNSS signals without the differential corrections; determine a position for the terminal based on the GNSS signals and the differential corrections in response to a determination that the position estimate for the terminal will be improved; and stop the use of differential corrections broadcast by the DGNSS server and determining the position for the terminal based on the GNSS signals without the differential corrections in response to a determination that the position estimate for the terminal will not be improved.

In one implementation, a method performed by a differential Global Navigation Satellite System (DGNSS) server for positioning a terminal, the method includes connecting with the terminal to provide the terminal with differential corrections generated by a reference station for GNSS signals; receiving position information from the terminal comprising at least GNSS signals received by the terminal; receiving differential corrections generated by the reference station for the GNSS signals; determining whether a position estimate for the terminal will be improved using the GNSS signals and the differential corrections relative to using the GNSS signals without the differential corrections; broadcasting to the terminal the differential corrections generated by the reference station for the GNSS signals in response to a determination that the position estimate for the terminal will be improved; and sending to the terminal an indication to stop using the differential corrections in response to a determination that the position estimate for the terminal will not be improved.

In one implementation, a differential Global Navigation Satellite System (DGNSS) server configured for positioning a terminal, includes an external interface configured to wirelessly communicate with entities in a wireless network; at least one memory; at least one processor coupled to the external interface and the at least one memory, wherein the at least one processor is configured to: connect, via the external interface with the terminal to provide the terminal with differential corrections generated by a reference station for GNSS signals; receive, via the external interface, position information from the terminal comprising at least GNSS signals received by the terminal; receive, via the external interface, differential corrections generated by the reference station for the GNSS signals; determine whether a position estimate for the terminal will be improved using the GNSS signals and the differential corrections relative to using the GNSS signals without the differential corrections; broadcast, via the external interface, to the terminal the differential corrections generated by the reference station for the GNSS signals in response to a determination that the position estimate for the terminal will be improved; and send, via the external interface, to the terminal an indication to stop using the differential corrections in response to a determination that the position estimate for the terminal will not be improved.

In one implementation, a differential Global Navigation Satellite System (DGNSS) server configured for positioning a terminal, includes means for connecting with the terminal to provide the terminal with differential corrections generated by a reference station for GNSS signals; means for receiving position information from the terminal comprising at least GNSS signals received by the terminal; means for receiving differential corrections generated by the reference station for the GNSS signals; means for determining whether a position estimate for the terminal will be improved using the GNSS signals and the differential corrections relative to using the GNSS signals without the differential corrections; means for broadcasting to the terminal the differential corrections generated by the reference station for the GNSS signals in response to a determination that the position estimate for the terminal will be improved; and means for sending to the terminal an indication to stop using the differential corrections in response to a determination that the position estimate for the terminal will not be improved.

In one implementation, a non-transitory computer readable storage medium including program code stored thereon, the program code is operable to configure at least one processor in a differential Global Navigation Satellite System (DGNSS) server for positioning a terminal, the program code comprising instructions to: connect with the terminal to provide the terminal with differential corrections generated by a reference station for GNSS signals; receive position information from the terminal comprising at least GNSS signals received by the terminal; receive differential corrections generated by the reference station for the GNSS signals; determine whether a position estimate for the terminal will be improved using the GNSS signals and the differential corrections relative to using the GNSS signals without the differential corrections; broadcast to the terminal the differential corrections generated by the reference station for the GNSS signals in response to a determination that the position estimate for the terminal will be improved; and send to the terminal an indication to stop using the differential corrections in response to a determination that the position estimate for the terminal will not be improved.

In one implementation, a method performed by a terminal for positioning, the method includes wirelessly connecting with a differential Global Navigation Satellite System (DGNSS) server to receive differential corrections generated by a reference station for GNSS signals; receiving GNSS signals from a plurality of GNSS satellite vehicles; receiving the differential corrections generated by the reference station that are broadcast by the DGNSS server; sending to the DGNSS server position information comprising at least the GNSS signals; receiving from the DGNSS server an indication to stop using the differential corrections; and determining a position for the terminal based on the GNSS signals without the differential corrections.

In one implementation, a terminal configured for positioning, includes a wireless transceiver configured to wirelessly communicate with entities in a wireless network; a Global Navigation Satellite System (GNSS) receiver; at least one memory; at least one processor coupled to the wireless transceiver, the GNSS receiver and the at least one memory, wherein the at least one processor is configured to: wirelessly connect, via the wireless transceiver, with a differential Global Navigation Satellite System (DGNSS) server to receive differential corrections generated by a reference station for GNSS signals; receive, via the GNSS receiver, GNSS signals from a plurality of GNSS satellite vehicles; receive, via the wireless transceiver, the differential corrections generated by the reference station that are broadcast by the DGNSS server; send, via the wireless transceiver, to the DGNSS server position information comprising at least the GNSS signals; receive, via the wireless transceiver, from the DGNSS server an indication to stop using the differential corrections; and determine a position for the terminal based on the GNSS signals without the differential corrections.

In one implementation, a terminal configured for positioning, includes means for wirelessly connecting with a differential Global Navigation Satellite System (DGNSS) server to receive differential corrections generated by a reference station for GNSS signals; means for receiving GNSS signals from a plurality of GNSS satellite vehicles; means for receiving the differential corrections generated by the reference station that are broadcast by the DGNSS server; means for sending to the DGNSS server position information comprising at least the GNSS signals; means for receiving from the DGNSS server an indication to stop using the differential corrections; and means for determining a position for the terminal based on the GNSS signals without the differential corrections.

In one implementation, a non-transitory computer readable storage medium including program code stored thereon, the program code is operable to configure at least one processor in a terminal for positioning, the program code comprising instructions to: wirelessly connect with a differential Global Navigation Satellite System (DGNSS) server to receive differential corrections generated by a reference station for GNSS signals; receive GNSS signals from a plurality of GNSS satellite vehicles; receive the differential corrections generated by the reference station that are broadcast by the DGNSS server; send to the DGNSS server position information comprising at least the GNSS signals; receive from the DGNSS server an indication to stop using the differential corrections; and determine a position for the terminal based on the GNSS signals without the differential corrections.

In one implementation, a method performed by a differential Global Navigation Satellite System (DGNSS) server for positioning a terminal, the method includes receiving an indication of DGNSS capabilities from the terminal; selecting differential corrections generated by a reference station for GNSS signals based on the DGNSS capabilities of the terminal; and sending the selected differential corrections to the terminal.

In one implementation, a differential Global Navigation Satellite System (DGNSS) server configured for positioning a terminal, includes an external interface configured to wirelessly communicate with entities in a wireless network; at least one memory; at least one processor coupled to the external interface and the at least one memory, wherein the at least one processor is configured to: receive, via the external interface, an indication of DGNSS capabilities from the terminal; select differential corrections generated by a reference station for GNSS signals based on the DGNSS capabilities of the terminal; and send, via the external interface, the selected differential corrections to the terminal.

In one implementation, a differential Global Navigation Satellite System (DGNSS) server configured for positioning a terminal, includes means for receiving an indication of DGNSS capabilities from the terminal; means for selecting differential corrections generated by a reference station for GNSS signals based on the DGNSS capabilities of the terminal; and means for sending the selected differential corrections to the terminal.

In one implementation, a non-transitory computer readable storage medium including program code stored thereon, the program code is operable to configure at least one processor in a differential Global Navigation Satellite System (DGNSS) server for positioning a terminal, the program code comprising instructions to: receive an indication of DGNSS capabilities from the terminal; select differential corrections generated by a reference station for GNSS signals based on the DGNSS capabilities of the terminal; and send the selected differential corrections to the terminal.

In one implementation, a method performed by a terminal for positioning, the method includes sending an indication of Differential Global Navigation Satellite System (DGNSS) capabilities to a DGNSS server; and receiving selected differential corrections for GNSS signals from the DGNSS server, wherein the selected differential corrections are generated by a reference station for the GNSS signals and are selected based on the DGNSS capabilities of the terminal.

In one implementation, a terminal configured for positioning, includes a wireless transceiver configured to wirelessly communicate with entities in a wireless network; at least one memory; at least one processor coupled to the wireless transceiver and the at least one memory, wherein the at least one processor is configured to: send, via the wireless transceiver, an indication of Differential Global Navigation Satellite System (DGNSS) capabilities to a DGNSS server; and receive, via the wireless transceiver, selected differential corrections for GNSS signals from the DGNSS server, wherein the selected differential corrections are generated by a reference station for the GNSS signals and are selected based on the DGNSS capabilities of the terminal.

In one implementation, a terminal configured for positioning, includes means for sending an indication of Differential Global Navigation Satellite System (DGNSS) capabilities to a DGNSS server; and means for receiving selected differential corrections for GNSS signals from the DGNSS server, wherein the selected differential corrections are generated by a reference station for the GNSS signals and are selected based on the DGNSS capabilities of the terminal.

In one implementation, a non-transitory computer readable storage medium including program code stored thereon, the program code is operable to configure at least one processor in a terminal for positioning, the program code comprising instructions to: send an indication of Differential Global Navigation Satellite System (DGNSS) capabilities to a DGNSS server; and receive selected differential corrections for GNSS signals from the DGNSS server, wherein the selected differential corrections are generated by a reference station for the GNSS signals and are selected based on the DGNSS capabilities of the terminal.

BRIEF DESCRIPTION OF THE DRAWINGS

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
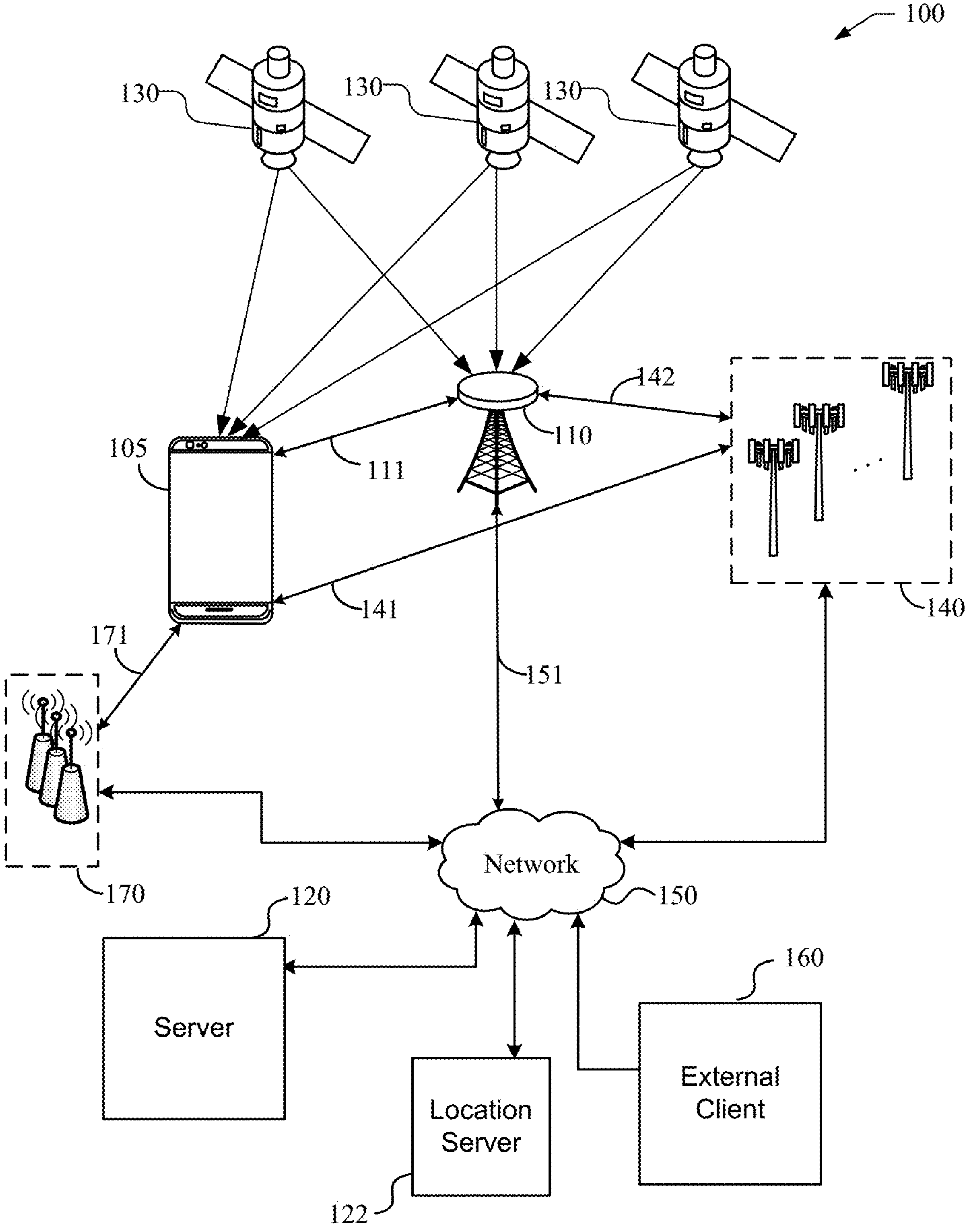
FIG. 1 is a simplified illustration of a positioning system for differential GNSS (DGNSS) including a terminal, reference station, and a DGNSS server.

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "one or more processors configured to" perform the described action.

The location of a terminal may be estimated based on pseudo-ranges for a sufficient number of satellites in a GNSS and the known locations of the satellites. The pseudo-ranges for the satellites may be determined by the terminal based on signals transmitted by the satellites. The pseudo-ranges may have errors due to various sources such as (i) propagation delays of the satellite signals through the ionosphere and troposphere, (ii) errors in ephemeris data describing the locations and velocities of the satellites, (iii) clock drift on the satellites, and/or (iv) pseudo-random errors deliberately introduced in the satellite signals via a process referred to as selective availability (SA). The errors in the pseudo-ranges result in a limited positioning accuracy for the terminal.

Accuracy from GNSS measurements may be improved using differential GNSS (DGNSS) in which measurements from a primary GNSS system are corrected using information provided by an accurately surveyed reference station. Because an accurate position of the reference station is known, the deviation of the measured position to the actual position of the reference station can be determined and corrections to the measured pseudo-ranges to each of the individual satellites can be calculated. The reference station broadcast the corrections to the pseudo-ranges or the GNSS position, which is received by terminal employing DGNSS. The corrections, along with the GNSS measurements from the terminal, may then be used by the terminal or a server to calculate a position of the terminal with increased accuracy. The use of DGNSS relies on the slow variation with respect to time and user position of errors due to the propagation delays of the satellite signals through the ionosphere and troposphere, ephemeris data describing the locations and velocities of the satellites, and clock drift on the satellites.

Currently, in order to employ DGNSS techniques, e.g., using the differential corrections generated by a reference station, the terminal must continuously receive the broadcast differential corrections and apply the differential corrections for determining the position of the terminal. There are some environments, however, in which DGNSS techniques are less effective in significantly improving position accuracy, such as where there are uncorrelated positioning errors. Consequently, continuous reception and application of broadcast differential corrections may unnecessarily consume large amounts of battery power and consume high CPU utilization MIPS (million instructions per second).

Accordingly, as discussed herein, a terminal position that uses DGNSS may stop using differential corrections generated by a reference station if it is determined that the use of the differential corrections provides no or little improvement in positioning. For example, the terminal may disconnect from the DGNSS server so that the differential corrections are not received, or may stop using any received differential corrections in position determination, thereby reducing power and processor consumption. Moreover, the terminal may provide its DGNSS capabilities, e.g., supported GNSS constellations and/or frequency bands, to a DGNSS server, which selects differential corrections to be provided to the terminal based on the terminal's DGNSS capabilities, further reducing power demands and lowering overhead.

FIG. 1 is a simplified illustration of a positioning system 100 in which a reference station 110, server 120, and other components of the positioning system 100 may be used to generate an estimated location of a terminal 105 using differential GNSS, as described herein. The techniques described herein may be implemented by one or more components of the positioning system 100, such as the server 120, the reference station 110 or the terminal 105. The server 120, for example, may be dedicated for providing DGNSS services (and therefore server 120 may sometimes be referred to as a DGNSS server). The server 120 or a separate server may additionally perform location services for the terminal 105. In addition to the terminal 105, reference station 110, and server 120, the positioning system 100 may include one or more satellites 130 (also referred to as space vehicles or satellite vehicles) for a Global Navigation Satellite System (GNSS) such as the Global Positioning System (GPS), base stations 140, a wireless network 150, an external client 160, and access points (APs) 170.

Terminal 105 may be stationary or mobile and may also be referred to as a mobile station (MS), a user equipment (UE), an access terminal (AT), a subscriber station, a station (STA), a rover, a rover station, etc. In general, the terminal 105 may be any wireless communication device (e.g., a mobile phone, router, tablet computer, laptop computer, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) that uses positioning via GNSS.

The terminal 105 may communicate with a network 150 via a Radio Access Network (RAN), through the core network the terminal may be connected with external networks such as the Internet. The terminal 105 may transmit and receive wireless signals for various communication operations, including data and control. A Wireless Wide Area Network (WWAN) transmitter, for example, may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, satellite-based, communication systems. In some implementations, satellite-based communication systems may be combined with terrestrial wireless communications systems, such as 5G New Radio (NR) networks. In such a system, a mobile device may access a satellite, also referred to as a satellite vehicle, instead of a terrestrial base station, which may connect to an earth station, also referred to as a ground station or non-terrestrial (NTN) gateway, which in turn may connect to a 5G network. Of course, other mechanisms of connecting to the core network and/or the Internet are also possible for the terminal, such as over wired access networks, wireless local area network (WLAN) networks (e.g., based on IEEE 802.11, Long-Term Evolution (LTE) Direct, etc.) and so on. As discussed herein, positioning of the terminal is performed using consumer based positioning techniques, including satellite wireless positioning and/or terrestrial based positioning.

Base stations 140 may support radio communication for terminals within its coverage and depending on the technology of the wireless network, a base station 140 may be a node B, an Evolved Node B (eNodeB or eNB), a base transceiver station (BTS), a radio base station (RBS), a New Radio (NR) NodeB (gNB), a Next Generation eNB (ng-eNB), or the like. A base station 140 that is a gNB or ng-eNB may be part of a Next Generation Radio Access Network (NG-RAN) which may connect to a 5G Core Network (5GC) in the case that network is a 5G network. An AP 170 may comprise a Wi-Fi AP or a Bluetooth® AP, for example. Thus, terminal 105 may send and receive information with network-connected devices, such as the reference station 110 and/or the server 120, by accessing the network 150 via a base station 140 using a communication link 141. Additionally or alternatively, because APs 170 also may be communicatively coupled with the network 150, the terminal 105 may communicate with Internet-connected devices, including reference station 110 and/or the server 120, using a communication link 171 with an AP. Additionally, or alternatively, the terminal 105 may send and receive information with the reference station 110 directly via a communication link 111. The reference station 110 may communicate with the server 120 and/or terminal 105, e.g., via base stations 140 and network 150 through communication link 142 or communication link 151.

Terminal 105 may include satellite positioning system (SPS) receiver to receive and measure signals from satellites 130 to obtain pseudo-ranges for the satellites. The satellites may be part of the United States Global Positioning System (GPS), the European Galileo system, the Russian GLONASS system, the Japanese Quasi-Zenith Satellite System (QZSS), the Chinese Compass/Beidou system, the Indian Regional Navigational Satellite System (IRNSS), some other SPS or a combination of these systems. The pseudo-ranges and the known locations of the satellites may be used to derive a location estimate for terminal 105. A location estimate may also be referred to herein as a location, estimated location, position, position estimate, position fix, estimated position, fix, location fix, etc. A location of terminal 105 may comprise an absolute location of terminal 105 (e.g. a latitude and longitude and possibly altitude) or a relative location of terminal 105 (e.g. a location expressed as distances north or south, cast or west and possibly above or below some other known fixed location or some other location such as a location for terminal 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which terminal 105 is expected to be located with some level of confidence (e.g. 95% confidence).

Terminal 105 may also receive and measure signals from base stations 140 to obtain timing and/or signal strength measurements for the base stations. The timing and/or signal strength measurements and the known locations of the base stations may be used to derive a location estimate for terminal 105. In general, a location estimate may be derived based on measurements for satellites, base stations, pseudolites, and/or other transmitters and using one or a combination of positioning methods. An estimated location of terminal 105 may be used in a variety of applications—e.g. to assist direction finding or navigation for a user of terminal 105 or to assist another user (e.g. associated with external client 160) to locate terminal 105, etc.

The location of the terminal 105 may be estimated based on pseudo-ranges for a sufficient number of satellites 130 in a GNSS and the known locations of the satellites. The pseudo-ranges for the satellites 130 may be determined by the SPS receiver in the terminal 105 based on the signals transmitted by the satellites 130 and received by the SPS receiver. The pseudo-ranges may have errors due to various sources such as (i) propagation delays of the satellite signals through the ionosphere and troposphere, (ii) errors in ephemeris data describing the locations and velocities of the satellites, (iii) clock drift on the satellites, and/or (iv) pseudo-random errors deliberately introduced in the satellite signals via a process referred to as selective availability (SA). The errors in the pseudo-ranges result in a limited positioning accuracy for the terminal.

The accuracy from GNSS measurements for the terminal 105 may be improved using differential GNSS (DGNSS) in which measurements from a primary GNSS system are corrected using information provided by an accurately surveyed reference station.

The reference station 110 includes a GNSS receiver with an accurately surveyed, known position. The reference station 110 may receive and measure signals from satellites 130 and may determine pseudo-ranges for the satellites based on the signal measurements. Because an accurate position of the reference station 110 is known, the deviation of the measured position to the actual position of the reference station 110 can be determined and corrections to the measured pseudo-ranges to each of individual satellite vehicle 130 may be calculated. For example, the ranges to the satellites 130 from the reference station 110 may be computed based on known location of the reference station 110 and known locations of the satellites 130, which may be obtained via ephemeris data sent by the satellites. Reference station 110 may determine a pseudo-range correction for each satellite based on the difference between the measured pseudo-range and the computed range for that satellite. The reference station 110 may additionally or alternatively determine a correction for a GNSS position based on a position of the reference station 110 determined from GNSS signals and the known position of the reference station 110. The reference station 110 may provide the differential corrections, i.e., corrections to the pseudo-ranges and/or the GNSS position to the server 120.

The server 120 receives differential corrections from one or more reference stations 110 and may collate the data and broadcast differential corrections to terminals, such as terminal 105. The differential corrections are received by terminal 105 e.g., via the base stations 140 via link 141. In some implementations, the server 120 may broadcast the differential corrections to the terminal 105 directly, or the reference station 110 may broadcast the differential corrections.

A location server 122 may communicate with network 150 to support positioning and location services for terminals, such as terminal 105. Location services may include any services based on or related to location information. For example, the location server 122 that supports location services for the terminal 105 may be a Secure User Plane Location (SUPL) Location Platform (SLP), a Mobile Positioning Center (MPC), a Gateway Mobile Server (GMLC), Location Management Function (LMF), etc. In some implementations, the functions of server 120 and location server 122 may be combined.

The differential corrections obtained from the reference station 110, along with the GNSS measurements obtained from the terminal 105, may be used in a positioning engine, e.g., in the terminal 105 or a location server, to calculate a position of the terminal 105 with increased accuracy. The use of DGNSS relies on the slow variation with respect to time and user position of errors due to the propagation delays of the satellite signals through the ionosphere and troposphere, ephemeris data describing the locations and velocities of the satellites, and clock drift on the satellites.

There are some environments, however, in which DGNSS techniques are less effective in improving position accuracy in a significant manner, such as where there are uncorrelated positioning errors, such as multipath and interference.

Figure 2:
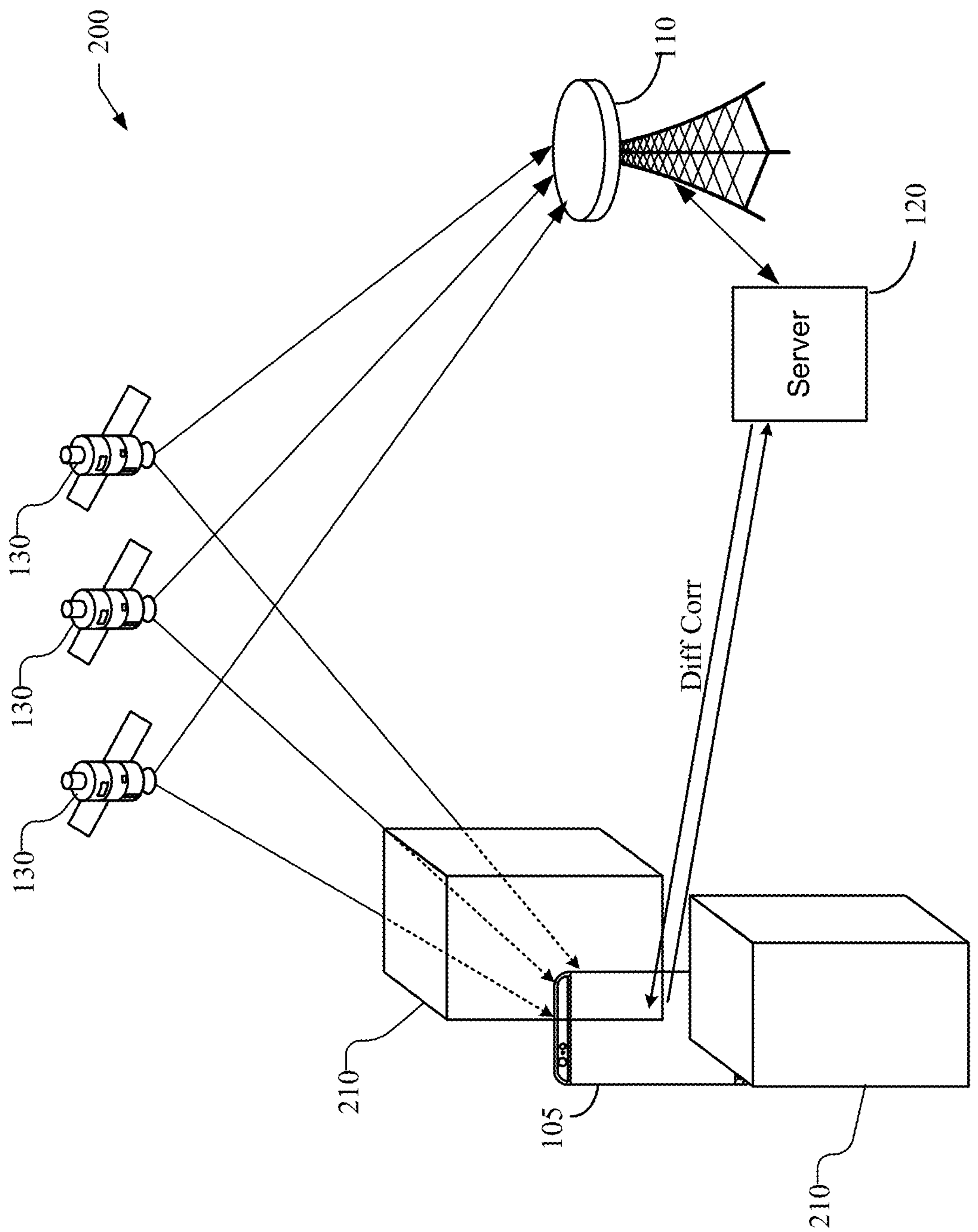
FIG. 2 illustrates an environment in which poor reception of GNSS signals results in differential corrections from the reference station providing little or no improvement to the position determination of the terminal.

FIG. 2, by way of example, illustrates an environment 200 in which the terminal 105 is located in a Deep/Urban canyon, in which structures 210 prevent good reception of GNSS signals from satellite vehicles 130. As illustrated in FIG. 2, the terminal 105 and reference station 110 receive GNSS signals from the satellite vehicles 130. The reference station 110 has good line of sight to the satellite vehicles 130 and accordingly may produce accurate differential corrections for the GNSS signals. The differential corrections from the reference station 110 are provided to the server 120 and the server 120 broadcasts the differential corrections to the terminal 105. It should be understood that while FIG. 2 illustrates a direct connection between terminal 105 and the server 120 for the sake of simplicity and clarity, the server 120 may in fact communicate with terminal 105, including broadcasting the differential corrections for the terminal 105, through one or more intermediary entities, such as network 150 and base stations 140 or APs 170, as shown in FIG. 1.

In the environment 200 shown in FIG. 2, the terminal 105 may have poor line of sight to the satellite vehicles 130, which may result in the GNSS signals being obstructed, having poor signal to noise ratio (SNR), including multipath components, or interference, etc. Other challenges to good reception of the GNSS signals may include, e.g., jamming of the GNSS signals. In a challenging environment, such as environment 200, the GNSS derived position of the terminal 105 may be relatively inaccurate compared to open environments with clear line of sight to GNSS satellite vehicles 130. In such challenging environments, position accuracy improvements for the terminal 105 that may be achieved using differential corrections produced by the reference station 110 may be limited. Additionally, even if the reception of the GNSS signals is good, the differential corrections from the reference station 110 may not be useful for the terminal 105 if the distance between the terminal 105 and the reference station 110 is too great.

In current DGNSS systems, in order to employ DGNSS techniques, e.g., using differential corrections broadcast by a reference station, a terminal must continuously receive the broadcast corrections and be in the vicinity of the reference station so that the terminal and the reference station observe the same GNSS satellites. Accordingly, a terminal must remain connected to a DGNSS server to continuously receive the broadcast differential corrections and the GNSS engine (e.g., within the terminal or in a server) must continuously apply the differential corrections if valid for improving the position accuracy.

For example, in current implementations of DGNSS, a terminal receives the corrections from a server continuously, e.g., via a Hypertext Transfer Protocol (HTTP) connection with respect to a DGNSS server, e.g., server 120. Corrections received via the DGNSS server are received at the terminal, e.g., via the high-level operating system (HLOS) layers and are provided to the GNSS engine in the terminal. The GNSS engine checks for Entry conditions or Exit conditions to determine if the corrections are valid. Entry conditions and Exit conditions may be provided, for example, for LI DGNSS, SBAS, and DGNSS-multiconstellation. For example, entry conditions may require more than a threshold number of valid SVs and less than a threshold geometric horizontal dilution of precision (GDOP), and exit conditions may require less than a threshold number of valid SVs, more than a threshold GDOP or more than a threshold uncertainty.

If the received corrections are valid, then the Position Engine (PE) within the GNSS engine uses the corrections (along with received GNSS signals) to compute a position fix for the terminal. If the corrections are not valid, the PE does not use the corrections to compute a position fix. The position usage is then updated to the HLOS layers from the GNSS engine.

However, even if the corrections are invalid at the GNSS engine side, e.g., do not satisfy the entry conditions or satisfy the exit conditions, the terminal still receives the corrections continuously and all the processing must still take place. The continuous streaming of differential corrections and applying the differential corrections may consume large amounts of battery power (at the terminal side) and high CPU utilization (MIPS (million instructions per second) consumption) (at the terminal side and/or server side). In challenging environments, such as environment 200, shown in FIG. 2, there is little or no benefit to using DGNSS, and consequently, the continuous streaming and application of differential corrections in such environments is unnecessary and inefficient in terms of power at the terminal side and processing at the terminal and/or server side.

Accordingly, in one implementation, when the differential corrections provided by the reference station 110 will not yield improved positioning for the terminal 105 compared to positioning without the use of differential corrections, the continuous use of differential corrections may be interrupted for a period of time. For example, the continuous reception of the broadcast differential corrections by the terminal 105 may be stopped or the position determination for the terminal 105 may ignore the differential corrections.

The terminal 105, for example, may determine that its position determination may not be improved with the use of differential corrections based on one or more factors, such as the environment in which the terminal 105 is located (e.g., distance to reference station 110, located in a tunnel, a garage, or indoors), environmental conditions of a current position of the terminal 105, GNSS signal conditions (e.g., multipath components, interference, presence of jamming, poor SNR etc.). The environmental conditions in which the terminal 105 is located may be determined by the terminal 105, e.g., based on the signal reception, transmitting nodes that are visible to the terminal 105 (e.g., satellite vehicles 130, base stations 140, APs 170, etc.), and other sensor information. Additionally, the environment conditions may be mapped and stored in the terminal 105 and/or server 120, and compared to a current position of the terminal 105 or expected position based on a route that has been designed for the terminal 105. The terminal 105 may further generate a position with and without the differential corrections and determine if positioning is improved, e.g., improved accuracy or decreased uncertainty, etc. If the differential corrections are not useful, e.g., there are no or little (e.g., less than a threshold amount) of improvement in positioning, the terminal 105 may disconnect from the server 120 so that the terminal 105 no longer monitors the broadcast of differential corrections and, consequently, there is no need to process the differential corrections for position determination reducing power consumption and processing operations. In one implementation, the terminal 105 may remain connected to the server 120 to continue to receive the broadcast differential corrections, but may no longer use the differential corrections in the determination of a position for the terminal, thereby reducing processing operations. The disconnection or non-use of the differential corrections may be for a predetermined amount of time and/or until the environment, environmental conditions, or signal conditions improve. Moreover, the interruption of the use of the differential corrections may be initiated by the terminal or the server 120.

Figure 3:
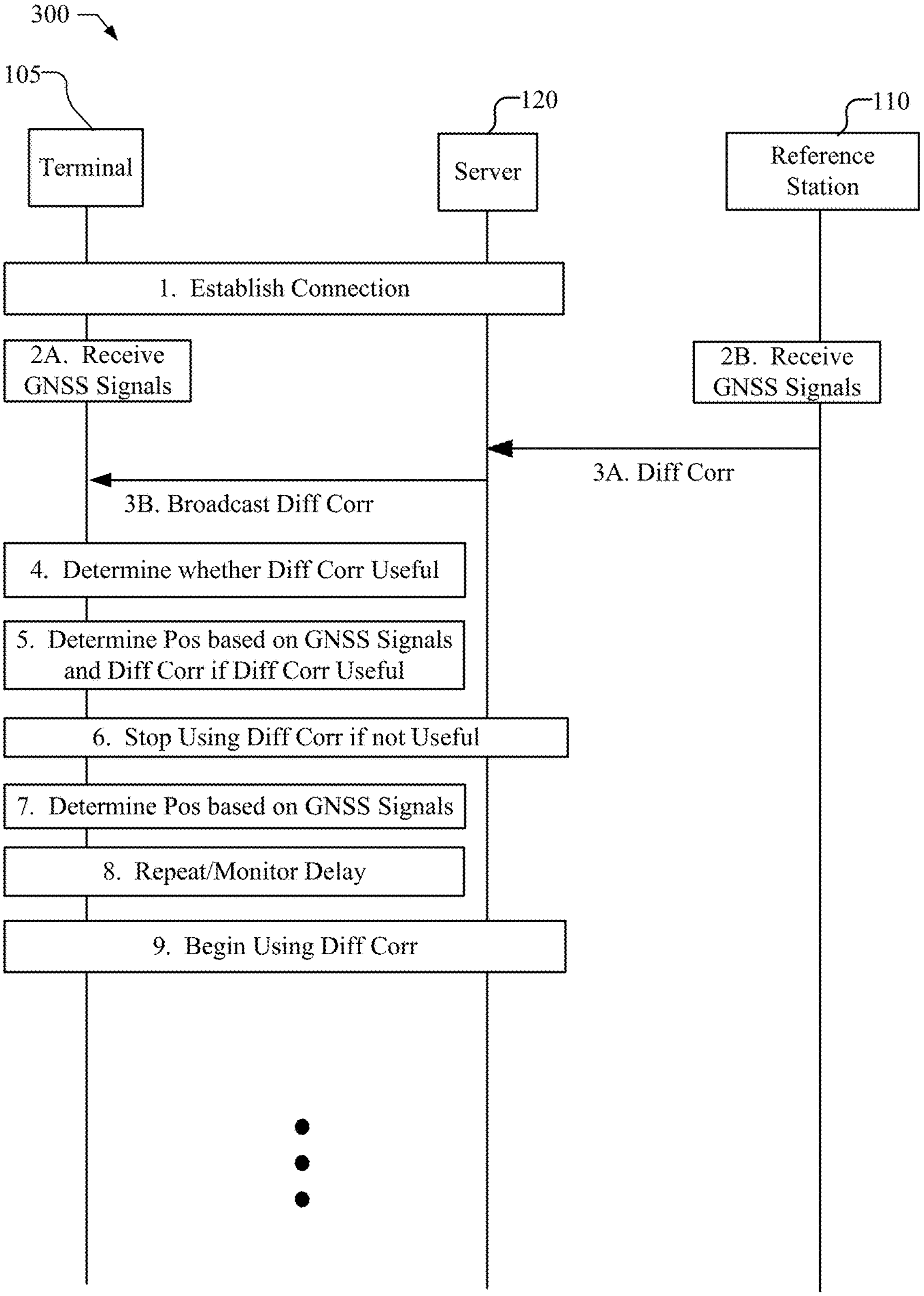
FIG. 3 illustrates an example of a signal flow for performing differential GNSS in which use of the interruption of the use of differential corrections may be initiated by the terminal.

FIG. 3, for example, illustrates an example of a signal flow 300 for performing differential GNSS in which use of the interruption of the use of differential corrections may be initiated by the terminal 105. The signal flow 300, for example, may be performed by the positioning system 100 shown in FIG. 1 and is illustrated as including the terminal 105, the reference station 110, and server 120. It should be understood that additional entities in the positioning system that are not necessary for understanding the implementations discussed herein are not shown, such as network 150 and base stations 140 (or APs 170) through which signaling between the terminal 105 and the server 120, and in some implementations between the reference station 110 and the server 120, may be transmitted. Moreover, FIG. 3 illustrates position determination as occurring within the terminal 105, e.g., in a terminal based positioning method, but in some implementations, the position determination may occur in a separate entity, such as a location server, e.g., in a terminal assisted positioning method, in which the terminal 105 provides location information to the location server.

At stage 1 in signal flow 300, a wireless connection between terminal 105 and the server 120 is established so that the terminal 105 may receive differential corrections for GNSS signals from the reference station 110. The terminal 105 may check for validity conditions, before establishing a connection. In some implementations, the connection may be established with the reference station 110 directly or through network 150. In some implementations, the connection may be a subscription based connection, in which the terminal 105 subscription is authenticated by the server 120 prior to establishing the connection. Once the connection is established, the terminal 105 may begin receiving broadcast differential corrections from the server 120 that are generated by the reference station 110.

At stage 2A and stage 2B, the terminal 105 and the reference station 110, respectively, receive GNSS signals from a number of GNSS satellite vehicles 130, illustrated in FIG. 3. It should be understood that the terminal 105 and reference station 110 continue to receive GNSS signals throughout the signal flow 300.

At stage 3A, the reference station 110 generates differential corrections for the GNSS signals, e.g., corrections to the pseudo-ranges and/or the GNSS position as discussed above, based on the known position of the reference station 110 and the GNSS signals received from the satellites in stage 2B. The differential corrections are provided by the reference station 110 to the server 120.

At stage 3B, the server 120 broadcasts the differential corrections to the terminal 105, e.g., through network 150 and base stations 140 (not shown). The server 120 may collect data from multiple reference stations, and may collate the differential corrections before broadcasting the differential corrections to be received by the terminal 105. For example, the reference station 110 may provide received GNSS signal information to the server 120 and the server may determine the differential corrections for the GNSS signals. In some implementations, instead of the server 120 broadcasting the differential corrections, the reference station 110 may broadcast the differential corrections, e.g., via network 150 and base stations 140. It should be understood that the terminal 105 continues to receive the differential corrections broadcast by the server 120 until the connection between the terminal 105 and server 120 is disconnected.

At stage 4, the terminal 105 may determine whether the differential corrections received at stage 3B are useful. For example, the terminal 105 may determine if the position determination generated using the GNSS signals obtained at stage 2A without use of the differential corrections will be improved with the use of the differential corrections in the position determination. The terminal 105, for example, may determine whether the differential corrections may be useful based on one or more factors. For instance, the terminal 105 may determine the environment in which it is located and may determine whether the differential corrections may be useful based on environmental factors. The terminal 105, for example, may determine whether it is in a tunnel, a garage, or indoors, or other environment in which GNSS signal reception may be poor. The determination of the environment, for example, may be based on a known or estimated location of the terminal 105, which may be correlated to a map, as well as other sensor information. For example, the list of satellites 130, base stations 140, and/or APs 170, that are visible to the terminal 105, as well as an indication in changes in the list, may provide an indication of the environment of the terminal 105.

In another example, the terminal 105 may determine whether the differential corrections may be useful based on conditions at a current position of the terminal 105. For example, if the current position of the terminal 105 is greater than a predetermined distance from the reference station 110, e.g., greater than 100 km, then the distance differential corrections may not be useful. The position of the reference station 110 or the distance between the terminal 105 and the reference station 110 may be provided, e.g., by the server 120 or a separate location server. In another example, the conditions may be based on the current position of the terminal or expected position based on known route for the terminal 105. For example, if the terminal 105 is traveling between locations, different positions along the route may be known to have poor GNSS reception, e.g., in a city or urban canyons, or good GNSS reception, e.g., along a freeway. Thus, once the route between locations for the terminal 105 is known, the environmental conditions along the route may be likewise obtained. For example, the server 120 (or another server, such as a location server or third party server) may provide a map with an environment type mask or polygon that provides the environmental conditions at different positions along the route or in the area in general. The terminal 105 may use the environmental type mask or polygon and its current position to determine whether the differential corrections may be useful based on the environmental conditions at the current position of the terminal 105.

In another example, the terminal 105 may determine GNSS signal parameters and may determine whether the differential corrections may be useful based on GNSS signal parameters. For example, the terminal 105 may determine if the GNSS signals include multipath components, or are being jammed, or the SNR of the GNSS signals. The terminal 105 may determine that the differential corrections are not useful if there is an indication of multipath components in the GNSS signals, an indication of jamming of the GNSS signals, an SNR of the GNSS signals that is less than a predetermined threshold, or any combination thereof.

In another example, the terminal 105 may determine whether the differential corrections may be useful based on a comparison of position estimates generated with the differential corrections and without the differential corrections. For example, the terminal 105 (or a location server) may determine a first estimated location of the terminal 105 using the GNSS signals and the differential corrections received at stage 3B, and may determine a second estimated location of the terminal using only the GNSS signals. A comparison of the first and second estimated locations may be used to provide an indication of whether the differential corrections is useful. For example, if the magnitude of uncertainty or error is less (or less than a predetermined threshold amount) for the position determined based on GNSS signals and differential corrections than the position determined using only GNSS signals, then differential corrections may be considered useful.

At stage 5, the terminal 105 may determine a position for the terminal 105 based on the GNSS signals from stage 2A and differential corrections received at stage 3B if the terminal 105 determined in stage 4 that the differential corrections are useful, i.e., the position determination for the terminal 105 will be improved using the differential corrections. In some implementations, the terminal 105 may determine the position by sending the GNSS signals and differential corrections to a location server (not shown), which calculates the position of the terminal 105. Assuming that the differential corrections are determined to be useful, the terminal 105 may continue to perform stages 2A-5 without proceeding with the remaining of the signal flow 300 until the differential corrections are determined to be not useful.

At stage 6, the terminal 105 stops using the differential corrections if the terminal 105 determined in stage 4 that the differential corrections are not useful, i.e., the position determination for the terminal 105 will not be improved using the differential corrections. For example, the terminal 105 may disconnect from the server 120, i.e., the terminal 105 will tear down the connection with the server 120, if the differential corrections from stage 3B are determined to not be useful in stage 4. The terminal 105 may disconnect, for example, by indicating to the server 120 to stop broadcasting differential corrections or by severing the connection with the server 120. When the terminal 105 disconnects from the server 120, the terminal 105 no longer receives the broadcast differential corrections, thereby saving power without degrading its GNSS positioning. In some implementations, rather than disconnecting form the server 120, the terminal 105 may remain connected to the server 120, but may stop using the received differential corrections in its GNSS position determination, thereby reducing processing operations without degrading its GNSS positioning. Assuming that the differential corrections are determined to be not useful in stage 4, the terminal 105 may proceed with the remainder of the signal flow 300.

At stage 7, the terminal 105 may determine a position for the terminal 105 based on only the GNSS signals from stage 2A, which the terminal 105 continues to receive, i.e., without the use of differential corrections received at stage 3B. For example, if the terminal 105 disconnected from the server 120 in stage 6, the terminal will no longer receive differential connections from the server 120. In implementations where the terminal 105 remains connected to the server 120 at stage 6, the terminal 105 may ignore any received differential corrections while determining its position using the GNSS signals. In some implementations, the terminal 105 may determine the position by sending the GNSS signals, without differential corrections, to a location server (not shown), which calculates the position of the terminal 105.

At stage 8, the terminal 105 repeats stage 7, i.e., continues to determine its position using GNSS signals without differential corrections, while monitoring a delay before using the differential corrections again. For example, the terminal 105 may be configured to wait a predetermined amount of time after stopping the use of the differential corrections before using the differential corrections again. In some implementations, the terminal 105 may additionally or alternatively monitor whether differential corrections may be useful based on the one or more factors described in stage 4 to determine whether to begin using the differential corrections again. For instance, the terminal 105 may monitor environmental factors, such as whether the terminal 105 is in a tunnel, a garage, or indoors, or other environment in which GNSS signal reception is compromised. The terminal 105, in another example, may monitor the environmental conditions of a current position of the terminal 105, e.g., whether the current position is known to have poor or good GNSS reception, e.g., based on the environmental type mask or polygon. The terminal may further monitor GNSS signal parameters such as an indications of multipath components in the GNSS signals, indications of jamming of the GNSS signals, a SNR of the GNSS signals that is less than a predetermined threshold, or any combination thereof.

At stage 9, the terminal 105 begins using the differential corrections again after the expiration of the delay and/or determining the differential corrections may be useful. For example, if the terminal disconnected from the server 120 in stage 6, after the expiration of the delay and/or determining the differential corrections may be useful, the terminal 105 may check for validity conditions, and if valid conditions exist may establish a wireless connection with the server 120 to receive the differential corrections from the reference station 110. Similar to stage 1, in some implementations, the connection may be established with the reference station 110 directly or through network 150. Once the connection is reestablished, the terminal 105 may begin receiving broadcast differential corrections generated by the reference station 110 (e.g., as illustrated in stage 3A and 3B) and the signal flow 300 may continue. If the terminal 105 remained connected to the server 120 in stage 6, but ignored the differential corrections when determining a position based on the GNSS signals at stage 7, after the expiration of the delay and/or determining the differential corrections may be useful, the terminal 105 may stop ignoring the differential corrections. The terminal 105, for example, may begin using the differential corrections generated by the reference station 110 and the signal flow 300 may continue. Thus, once the delay period has expired and/or the differential corrections are determined to be useful, the terminal 105 may determine the position of the terminal 105 based on the GNSS signals and differential corrections from the reference station.

In some implementations, the determination of whether to discontinue the connection and/or use of the differential corrections from the reference station 110 may be performed by the server 120 instead of the terminal 105.

Figure 4:
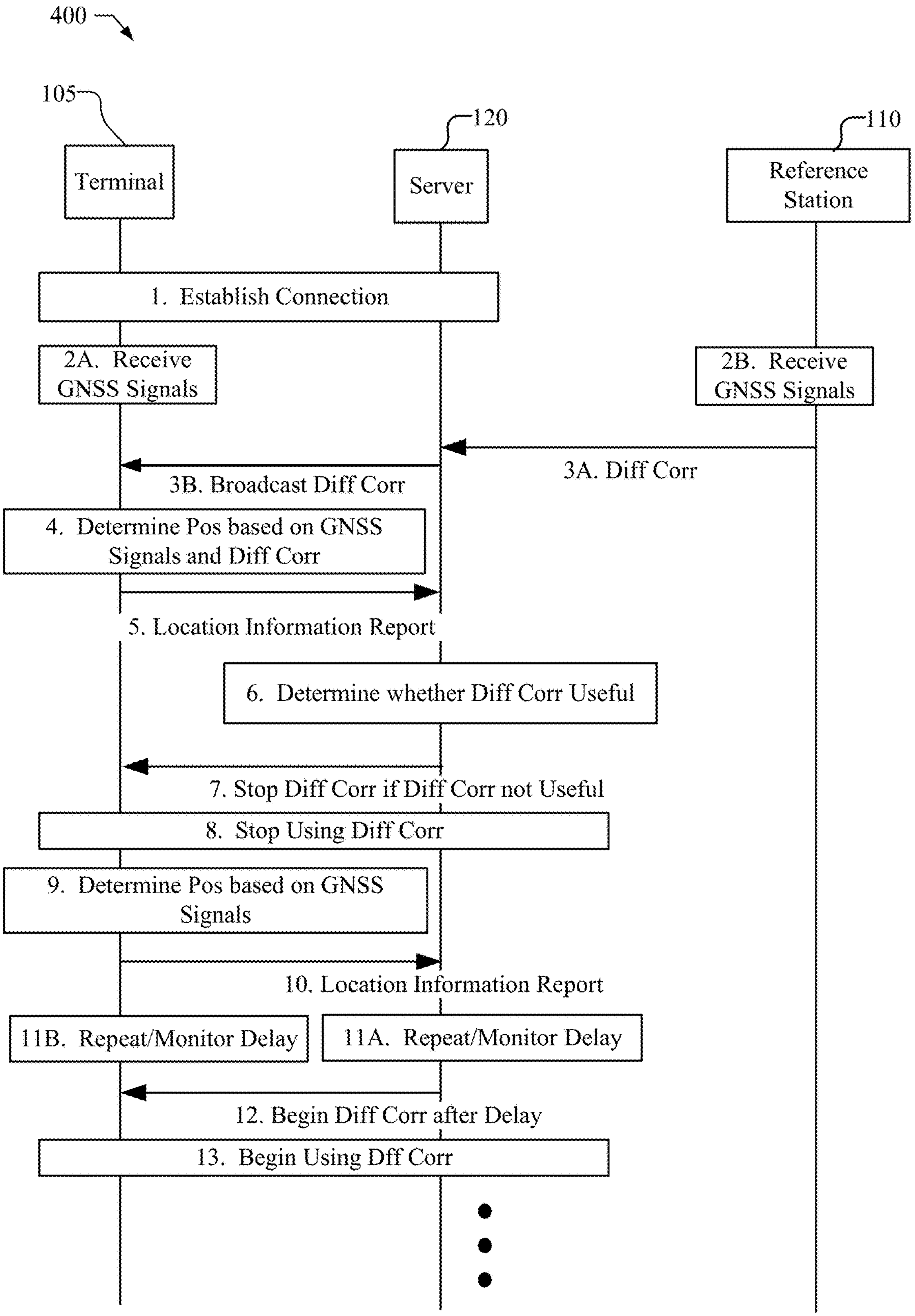
FIG. 4 illustrates an example of a signal flow for performing differential GNSS in which use of the interruption of the use of differential corrections may be initiated by the server.

FIG. 4, for example, illustrates an example of a signal flow 400 for performing differential GNSS in which use of the interruption of the use of differential corrections may be initiated by the server 120. The signal flow 400, for example, is similar to signal flow 300 shown in FIG. 3, but the server 120 controls the interruption of the reception of the differential corrections instead of the terminal 105. The signal flow 400 may be performed by the positioning system 100 shown in FIG. 1 and is illustrated as including the terminal 105, the reference station 110, and server 120. It should be understood that additional entities in the positioning system that are not necessary for understanding the implementations discussed herein are not shown, such as network 150 and base stations 140 (or APs 170) through which signaling between the terminal 105 and the server 120, and in some implementations between the reference station 110 and the server 120, may be transmitted. Moreover, FIG. 4 illustrates position determination as occurring within the terminal 105, e.g., in a terminal based positioning method, but in some implementations, the position determination may occur in a separate entity, such as a location server, e.g., in a terminal assisted positioning method, in which the terminal 105 provides location information to the location server.

At stage 1 in signal flow 400, a wireless connection between terminal 105 and the server 120 is established so that the terminal 105 may receive differential corrections for GNSS signals from the reference station 110. The terminal 105 may check for validity conditions, before establishing a connection. In some implementations, the connection may be established with the reference station 110 directly or through network 150. In some implementations, the connection may be a subscription based connection, in which the terminal 105 subscription is authenticated by the server 120 prior to establishing the connection. Once the connection is established, the terminal 105 may begin receiving broadcast differential corrections that are generated by the reference station 110.

At stage 2A and stage 2B, the terminal 105 and the reference station 110, respectively, receive GNSS signals from a number of GNSS satellite vehicles 130, illustrated in FIG. 1. It should be understood that the terminal 105 and reference station 110 continue to receive GNSS signals throughout the signal flow 400.

At stage 3A, the reference station 110 generates differential corrections for the GNSS, e.g., corrections to the pseudo-ranges and/or the GNSS position as discussed above, based on the known position of the reference station 110 and the GNSS signals received from the satellites in stage 2B. The differential corrections are provided by the reference station 110 to the server 120.

At stage 3B, the server 120 broadcasts the differential corrections to the terminal 105, e.g., through network 150 and base stations 140 (not shown). The server 120 may collect data from multiple reference stations, and may collate the differential corrections before broadcasting the differential corrections to be received by the terminal 105. For example, the reference station 110 may provide received GNSS signal information to the server 120 and the server may determine the differential corrections for the GNSS signals. In some implementations, instead of the server 120 broadcasting the differential corrections, the reference station 110 may broadcast the differential corrections, e.g., via network 150 and base stations 140. It should be understood that the terminal 105 continues to receive the differential corrections broadcast by the server 120 until the connection between the terminal 105 and server 120 is disconnected.

At stage 4, the terminal 105 may determine a position for the terminal 105 based on the GNSS signals from stage 2A and differential corrections received at stage 3B. In some implementations, the terminal 105 may determine the position by sending the GNSS signals and differential corrections to a location server (not shown), which calculates the position of the terminal 105.

At stage 5, the terminal 105 provides a location information report to the server 120 which includes one or more of the determined position of the terminal 105 (e.g., as determined at stage 4), position measurements (e.g., the GNSS signals received by the terminal 105 at stage 2A), or sensor measurements (e.g., measured GNSS parameters such as indications of multipath components in the GNSS signals, indications of jamming of the GNSS signals, a SNR of the GNSS signals), or a combination thereof.

At stage 6, the server 120 may determine whether the differential corrections received at stage 3B are useful based on the location information report received from the terminal 105 at stage 5. For example, the server 120 may determine if the position determination generated using the GNSS signals obtained at stage 2A without use of the differential corrections will be improved with the use of the differential corrections, similar to stage 4 in FIG. 3. The server 120, for example, may determine whether the differential corrections may be useful based on one or more factors. For instance, the server 120 may determine the environment in which the terminal 105 is located, based on the location information report from stage 5 and may determine whether the differential corrections may be useful based on environmental factors. For example, the server 120 may determine whether the terminal 105 is in a tunnel, a garage, or indoors, or other environment in which GNSS signal reception may be poor. The determination of the environment, for example, may be based on a position provided by the terminal in stage 5, which may be correlated to a map, as well as other sensor information provided by the terminal 105. For example, the list of satellites 130, base stations 140, and/or APs 170, that are visible to the terminal 105, as well as an indication in changes in the list, may provide an indication of the environment of the terminal 105.

In another example, the server 120 may determine whether the differential corrections may be useful based on conditions at a current position of the terminal 105. For example, if the current position of the terminal 105 is greater than a predetermined distance from the reference station 110, e.g., greater than 100 km, then the distance differential corrections may not be useful. The position of the reference station 110 or the distance between the terminal 105 and the reference station 110 may be known to the server 120 and the position of the terminal 105 may be provided in stage 5. In another example, the conditions may be based on the current position of the terminal 105 or expected position based on a known route for the terminal 105. For example, if the terminal 105 is traveling between locations, different positions along the route may be known to have poor GNSS reception, e.g., in a city or urban canyons, or good GNSS reception, e.g., along a freeway. Thus, once the route between locations for the terminal 105 is known, the environmental conditions along the route may be likewise obtained. For example, the terminal 105 may provide the route information to the server in stage 5, and the server 120 may obtain a map with an environment type mask or polygon that provides the environmental conditions at different positions along the route or in the area in general. The server 120 may use the environmental type mask or polygon and its current position to determine whether the differential corrections may be useful based on the environmental conditions at the current position of the terminal 105.

In another example, the server 120 may receive GNSS signal parameters from the terminal 105 in stage 5 and may determine whether the differential corrections may be useful based on GNSS signal parameters. For example, the server 120 may receive an indication from the terminal 105 if the GNSS signals include multipath components, or are being jammed, or the SNR of the GNSS signals. The server 120 may determine that the differential corrections are not useful if there is an indication of multipath components in the GNSS signals, an indication of jamming of the GNSS signals, an SNR of the GNSS signals that is less than a predetermined threshold, or any combination thereof.

In another example, the server 120 may determine whether the differential corrections may be useful based on a comparison of position estimates generated with the differential corrections and without the differential corrections. For example, server 120 may receive in stage 5 positioning measurements (e.g., GNSS signals). The server 120 may obtain a first estimated location of the terminal 105, e.g., either from an estimated position provided the terminal 105 in stage 5 or using the differential corrections and the GNSS signals received at respective stages 3A and 5, and may obtain a second estimated location of the terminal 105, e.g., either from an estimated position received in stage 5 or using the GNSS signals received in stage 5. A comparison of the first and second estimated locations may be used to provide an indication of whether the differential corrections is useful. For example, if the magnitude of uncertainty or error is less (or less than a predetermined threshold amount) for the position determined based on GNSS signals and differential corrections than the position determined using only GNSS signals, then differential corrections may be considered useful.

If the server 120 determines that the position determination for the terminal 105 will be improved with the use of the differential corrections from the reference station 110, the server 120 takes no action and stages 2A-6 may be repeated. For example, the terminal 105 may periodically provide the server 120 with a location information report in stage 5 and in response the server 120 may determine whether the differential corrections are useful in stage 6. Once the server 120 determines that the position determination for the terminal 105 will not be improved with the use of the differential corrections from the reference station 110 the remaining stages of signal flow 400 may be performed.

At stage 7, after the server 120 determines in stage 6 that the position determination for the terminal 105 will not be improved with the use of the differential corrections from the reference station 110, the server 120 sends a message to the terminal 105 indicating that the differential corrections are not useful and that the terminal 105 should stop using the differential corrections for positioning. The server 120 may provide the terminal 105 (and optionally the reference station 110) with a predetermined amount of time after which the terminal 105 may reestablish the connection with the server 120.

At stage 8, in some implementations, the terminal 105 stops using the differential corrections after the server 120 indicates that the terminal 105 should stop using the differential corrections in stage 7. For example, the terminal 105 may disconnect from the server 120, i.e., the terminal 105 may end the connection with the server 120. The terminal 105 may disconnect, for example, by indicating to the server 120 to stop broadcasting differential corrections or by severing the connection with the server 120. When the terminal 105 disconnects from the server 120, the terminal 105 no longer receives the broadcast differential corrections, thereby saving power without degrading its GNSS positioning. In some implementations, rather than disconnecting form the server 120, the terminal 105 may remain connected to the server 120, but may stop using the received differential corrections in its GNSS position determination, thereby reducing processing operations without degrading its GNSS positioning.

At stage 9, the terminal 105 may determine a position for the terminal 105 based on only the GNSS signals from stage 2A, which the terminal 105 continues to receive, i.e., without the use of differential corrections received at stage 3B. For example, if the terminal 105 disconnected from the server 120 in stage 7, the terminal will no longer receive differential connections from the server 120. In implementations where the terminal 105 remains connected to the server 120 at stage 7, the terminal 105 may ignore any received differential corrections while determining its position using the GNSS signals. In some implementations, the terminal 105 may determine the position by sending the GNSS signals, without differential corrections, to a location server (not shown), which calculates the position of the terminal 105.

At stage 10, the terminal 105 may provide a location information report to the server 120 which including one or more of the determined position of the terminal 105 (e.g., as determined at stage 9), position measurements (e.g., the GNSS signals received by the terminal 105 at stage 2A), or sensor measurements (e.g., measured GNSS parameters such as indications of multipath components in the GNSS signals, indications of jamming of the GNSS signals, a SNR of the GNSS signals), or a combination thereof. For example, if the terminal 105 did not disconnect from the server 120 in stage 8, the location information report at stage 10 may be sent to the server 120 with the current connection. If, however, the terminal 105 disconnected from the server 120 in stage 8, the connection would need to be reestablished with the server 120, i.e., an establish connection stage as discussed in stage 1 would be performed before a location information report 10 could be sent to the server 120.

At stages 11A and 11B, the server 120 and/or the terminal 105 may monitor a delay before the terminal 105 uses the differential corrections again, while stages 9 and 10 are repeated. For example, the server 120 and/or terminal 105 may be configured to wait a predetermined amount of time after stopping the use of the differential corrections before the terminal 105 uses the differential corrections again.

In some implementations, the server 120 may additionally or alternatively monitor whether differential corrections may be useful based on one or more factors as described in stage 6 to determine whether the terminal 105 should begin using the differential corrections again. For instance, the server 120 may monitor environmental factors, such as whether the terminal 105 is in a tunnel, a garage, or indoors, or other environment in which GNSS signal reception is compromised. The server 120, in another example, may monitor the environmental conditions of a current position of the terminal 105, e.g., whether the current position is known to have poor or good GNSS reception, e.g., based on the environmental type mask or polygon. The server 120 may further monitor GNSS signal parameters such as an indications of multipath components in the GNSS signals, indications of jamming of the GNSS signals, a SNR of the GNSS signals that is less than a predetermined threshold, or any combination thereof.

At stage 12, after the server 120 determines in stage 11A that the predetermined time has expired and/or the differential corrections from the reference station 110 may be useful, the server 120 sends a message to the terminal 105 indicating that the terminal should begin using differential corrections again.

At stage 13, the terminal 105 begins using the differential corrections again after the expiration of the delay determined in stage 11A or after the server 120 indicates that the terminal 105 should being using the differential corrections in stage 12. For example, if the terminal disconnected from the server 120 in stage 8, the terminal 105 may check for validity conditions, and if valid conditions exist may establish a wireless connection with the server 120 to receive the differential corrections from the reference station 110. Similar to stage 1, in some implementations, the connection may be established with the reference station 110 directly or through network 150. Once the connection is reestablished, the terminal 105 may begin receiving broadcast differential corrections generated by the reference station 110 (e.g., as illustrated in stage 3A and 3B) and the signal flow 400 may continue. If the terminal 105 remained connected to the server 120 in stage 8, but ignored the differential corrections when determining a position based on the GNSS signals at stage 9, the terminal 105 may stop ignoring the differential corrections for position determination. The terminal 105, for example, may begin using the differential corrections generated by the reference station 110 and the signal flow 400 may continue. Thus, once the delay period has expired and/or the terminal 105 receives an indication from the server 120, the terminal 105 may determine the position of the terminal 105 based on the GNSS signals and differential corrections from the reference station.

In conventional implementations, a terminal may establish a connection with a DGNSS server by providing only connection parameters, such as the server IP, mount point, port, etc. This may result in the terminal receiving differential corrections that the terminal does not support. For example, the terminal may receive differential corrections for unsupported GNSS constellations or bands, which may lead to unnecessary processing at the terminal side.

Accordingly, in some implementations, the terminal 105 may provide a DGNSS capabilities message to the server 120. The DGNSS capabilities, for example, may indicate the GNSS constellation(s) that are supported, the frequency band(s) that are supported, etc. The server 120 may then broadcast only supported differential corrections for the terminal 105. Accordingly, the terminal 105 receives differential corrections selectively based on its capabilities, rather than receiving all possible differential corrections including unsupported differential corrections.

Figure 5:
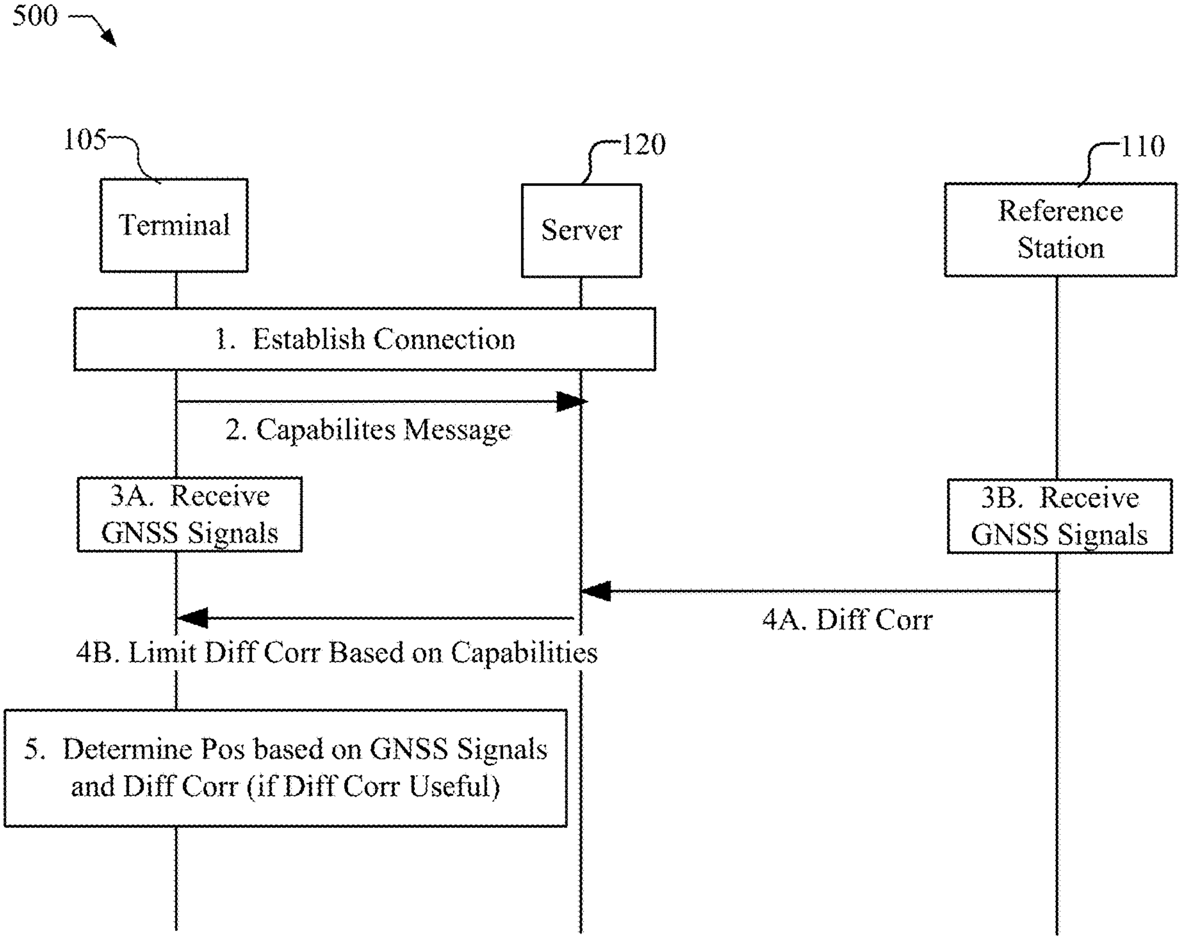
FIG. 5 illustrates an example of a signal flow for performing differential GNSS in which selective differential corrections are provided to the terminal based on the capabilities of the terminal.

FIG. 5, for example, illustrates an example of a signal flow 500 for performing differential GNSS in which selective differential corrections are provided to the terminal 105 based on the capabilities of the terminal 105. The signal flow 500, for example, may be similar to portions of signal flows 300 and 400 shown in FIGS. 3 and 4, respectively. The signal flow 500 may be performed by the positioning system 100 shown in FIG. 1 and is illustrated as including the terminal 105, the reference station 110, and server 120. It should be understood that additional entities in the positioning system that are not necessary for understanding the implementations discussed herein are not shown, such as network 150 and base stations 140 (or APs 170) through which signaling between the terminal 105 and the server 120, and in some implementations between the reference station 110 and the server 120, may be transmitted. Moreover, FIG. 5 illustrates position determination as occurring within the terminal 105, e.g., in a terminal based positioning method, but in some implementations, the position determination may occur in a separate entity, such as a location server, e.g., in a terminal assisted positioning method, in which the terminal 105 provides location information to the location server.

At stage 1 in signal flow 400, a wireless connection between terminal 105 and the server 120 is established so that the terminal 105 may receive differential corrections for GNSS signals from the reference station 110. The terminal 105 may check for validity conditions, before establishing a connection. In some implementations, the connection may be established with the reference station 110 directly or through network 150. In some implementations, the connection may be a subscription based connection, in which the terminal 105 subscription is authenticated by the server 120 prior to establishing the connection. Once the connection is established, the terminal 105 may begin receiving broadcast differential corrections that are generated by the reference station 110.

At stage 2, the terminal 105 sends a capabilities message to the server 120. The capabilities message, for example, may be embedded in a configuration parameter exchange and may be part of establishing the connection in stage 1. The capabilities message includes the DGNSS capabilities of the terminal 105, including one or more of the GNSS constellation(s) that are supported by terminal 105, the GNSS frequency band(s) that are supported by the terminal 105, or a combination thereof.

At stage 3A and stage 3B, the terminal 105 and the reference station 110, respectively, receive GNSS signals from a number of GNSS satellite vehicles 130, illustrated in FIG. 1. It should be understood that the terminal 105 and reference station 110 continue to receive GNSS signals throughout the signal flow 400.

At stage 4A, the reference station 110 generates differential corrections, e.g., corrections to the pseudo-ranges and/or the GNSS position as discussed above, based on the known position of the reference station 110 and the GNSS signals received from the satellites in stage 3B. The differential corrections are provided to the server 120.

At stage 4B, the server 120 selects differential corrections based on the capabilities of the terminal 105, as received at stage 2, and broadcasts the selected differential corrections, e.g., through network 150 and base stations 140, which are received by the terminal 105. In some implementations, the server 120 may inform the reference station 110 of the terminal 105 capabilities and the reference station 110 may broadcast selected differential corrections based on the capabilities of the terminal 105, e.g., via network 150 and base stations 140. The server 120 may collect differential corrections from a plurality of reference stations, and may collate the differential corrections before selecting differential corrections that are relevant to the terminal 105 based on its capabilities and broadcasting the selected differential corrections to be received by the terminal 105.

At stage 5, the terminal 105 (or location server) may determine a position for the terminal 105 based on the GNSS signals from stage 3A and the selected differential corrections received at stage 4B, if the differential corrections are determined to be useful, e.g., as discussed in FIGS. 3 and 4.

Figure 6:
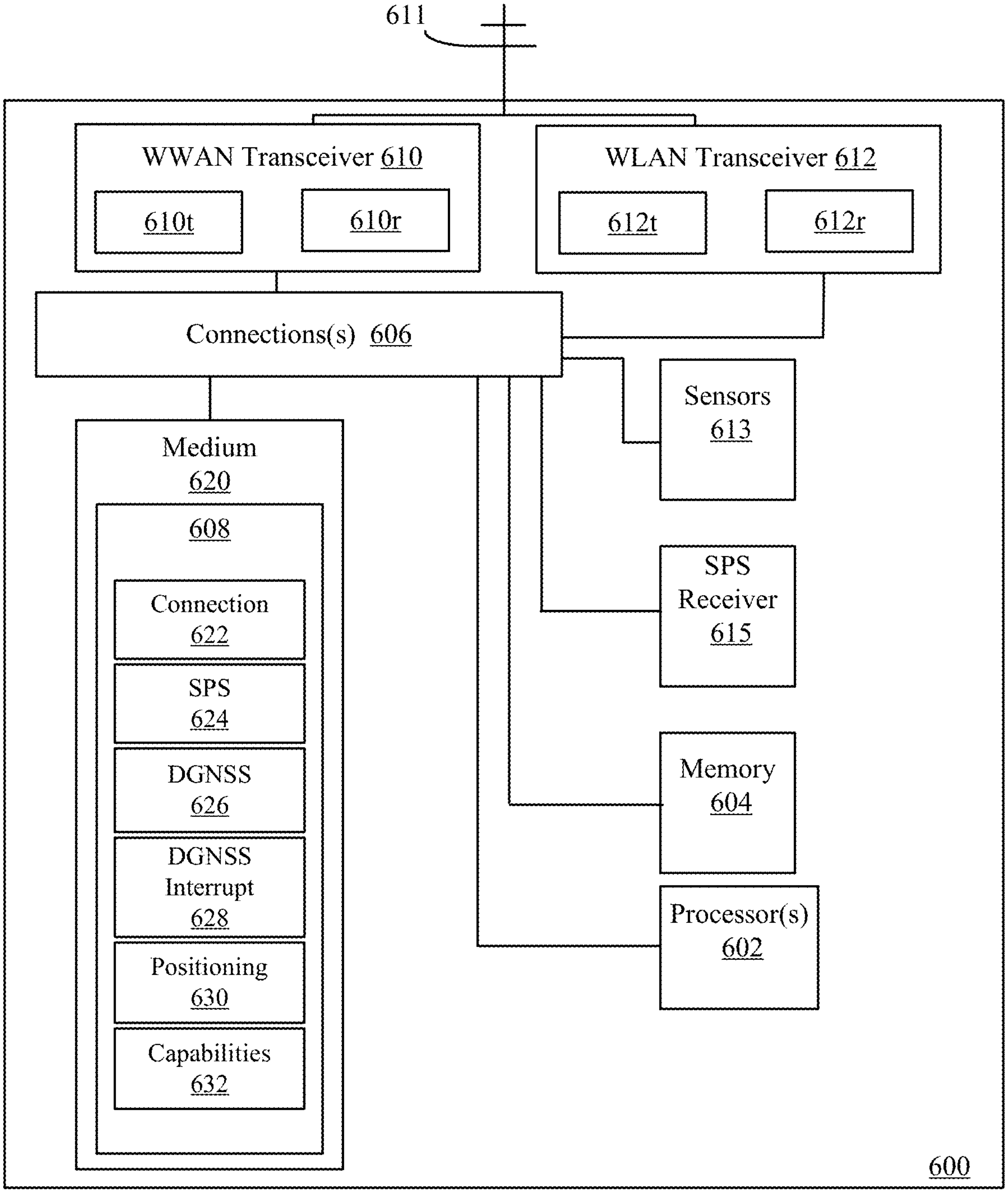
FIG. 6 shows a schematic block diagram illustrating certain exemplary features of a terminal for supporting positioning using differential GNSS, as described herein.

FIG. 6 shows a schematic block diagram illustrating certain exemplary features of a terminal 600, e.g., which may terminal 105 shown in FIGS. 1-5, and supports performing positioning using differential GNSS, as described herein. The terminal 600, for example, may perform the signal flows 300, 400, or 500 shown in respective FIG. 3, 4, or 5 and the process flows 800, 1000, and 1200 shown in respective FIGS. 8, 10, and 12. The terminal 600 may, for example, include one or more processors 602, memory 604, an external interface such as at least one wireless transceivers (e.g., wireless network interface) illustrated as WWAN transceiver 610 and WLAN transceiver 612, SPS receiver 615, and one or more sensors 613, which may be operatively coupled with one or more connections 606 (e.g., buses, lines, fibers, links, etc.) to non-transitory computer readable medium 620 and memory 604. The SPS receiver 615, for example, may receive and process SPS signals from satellite vehicles 130 shown in FIG. 1. The one or more sensors 613, for example, may be an inertial measurement unit (IMU) that may include one or more accelerometers, one or more gyroscopes, a magnetometer, etc. The terminal 600 may further include additional items, which are not shown, such as a user interface that may include e.g., a display, a keypad or other input device, such as virtual keypad on the display, through which a user may interface with the terminal. In certain example implementations, all or part of terminal 600 may take the form of a chipset, and/or the like.

The terminal 600 may include at least one wireless transceiver, such as wireless transceiver 610 for a WWAN communication system and wireless transceiver 612 for a WLAN communication system, or a combined transceiver for both WWAN and WLAN. The WWAN transceiver 610 may include a transmitter 610*t* and receiver 610*r* coupled to one or more antennas 611 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 612 may include a transmitter 612*t* and receiver 612*r* coupled to one or more antennas 611 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 610*t* and 612*t* may include multiple transmitters that may be discrete components or combined/integrated components, and/or the receivers 610*r* and 612*r* may include multiple receivers that may be discrete components or combined/integrated components. The WWAN transceiver 610 may be configured to communicate signals (e.g., with base stations and/or one or more other devices) according to a variety of radio access technologies (RATs) such as 6G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHZ frequencies. The WLAN transceiver 612 may be configured to communicate signals (e.g., with access points and/or one or more other devices) according to a variety of radio access technologies (RATs) such as 3GPP LTE-V2X (PC5), IEEE 602.11 (including IEEE 602.11p), WiFi, WiFi Direct (WiFi-D), Bluetooth®, Zigbee etc. The transceivers 610 and 612 may be communicatively coupled to a transceiver interface, e.g., by optical and/or electrical connection, which may be at least partially integrated with the transceivers 610 and 612.

In some embodiments, terminal 600 may include antenna 611, which may be internal or external. terminal antenna 611 may be used to transmit and/or receive signals processed by wireless transceivers 610 and 612. In some embodiments, terminal antenna 611 may be coupled to wireless transceivers 610 and 612. In some embodiments, measurements of signals received (transmitted) by terminal 600 may be performed at the point of connection of the terminal antenna 611 and wireless transceivers 610 and 612. For example, the measurement point of reference for received (transmitted) RF signal measurements may be an input (output) terminal of the receiver 610*r* (transmitter 610*t*) and an output (input) terminal of the terminal antenna 611. In a terminal 600 with multiple terminal antennas 611 or antenna arrays, the antenna connector may be viewed as a virtual point representing the aggregate output (input) of multiple terminal antennas.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of terminal 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in terminal 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in terminal 600 is merely exemplary, and as such the functionality of the modules and/or data structures may be combined, separated, and/or be structured in different ways depending upon the implementation of the terminal 600.

The medium 620 and/or memory 604 may include a connection module 622 that when implemented by the one or more processors 602 configures the one or more processors 602 to wirelessly connect with a DGNSS server, such as server 120 shown in FIG. 1, via the wireless transceiver 610 or wireless transceiver 612. The wireless connection with the DGNSS server, for example, may be through base stations 140 and network 150, as illustrated in FIG. 1. The wireless connection with the DGNSS server, for example, enables the terminal 600 to receive from differential corrections generated by a reference station for GNSS signals. The one or more processors 602 may be further configured to disconnect the wireless connection with the DGNSS server, e.g., so that the differential corrections broadcast by the DGNSS server are not received.

The medium 620 and/or memory 604 may include a SPS module 624 that when implemented by the one or more processors 602 configures the one or more processors 602 to receive GNSS signals from a plurality of GNSS satellite vehicles, via the SPS receiver 615. The one or more processors 602 may be further configured to measure one or more parameters of the GNSS signals, such as the SNR, or monitor for multipath components, or monitor for indications of jamming, etc.

The medium 620 and/or memory 604 may include a DGNSS module 626 that when implemented by the one or more processors 602 configures the one or more processors 602 to receive, via wireless transceiver 610 or wireless transceiver 612, differential corrections generated by the reference station that are broadcast by the DGNSS server, e.g., through a wireless network 150 and base stations 140. The one or more processors 602 may be further configured to send, via wireless transceiver 610 or wireless transceiver 612, to the DGNSS server position information that may include at least the GNSS signals. The one or more processors 602 may additionally send a determined position, environmental conditions determined via sensors 613 or SPS receiver 615, and determined GNSS signal parameters, such as an indication of multipath components in the GNSS signals, an indication of jamming of the GNSS signals, a signal to noise ratio of the GNSS signals, a list of satellites, base stations, and/or APs visible to the terminal 600, etc.

The medium 620 and/or memory 604 may include a DGNSS interrupt module 628 that when implemented by the one or more processors 602 configures the one or more processors 602 to determines whether to interrupt the use of differential corrections from a reference station. For example, the one or more processors 602 may be configured to determine whether to stop the use of differential corrections, i.e., to disconnect from the DGNSS server so that differential corrections are not received or not use the differential corrections, if received, in positioning measurements.

The one or more processors 602, for example, may determine whether to interrupt the use of differential corrections if a GNSS position determination will not be improved if differential corrections are used. For example, as described herein, the one or more processors may be configured to use one or more factors to determine whether the differential corrections are useful. For instance, the one or more processors 602 may be configured to consider the environment in which it is located, e.g., whether the terminal is in a tunnel, a garage, or indoors, or greater than a threshold distance from the reference station, to determine whether the differential corrections will not improve the position determination. The one or more processors 602 for example may be configured to determine the environment in which the terminal is located based on sensor information, such as the list of satellites, base stations, and/or APs visible to the terminal, or signal strength and whether there has been suddenly changes which may indicate a transition from blocked conditions or unblocked conditions. The one or more processors 602 may be configured to consider the environmental conditions for a current position of the terminal to determine if the differential corrections may be useful. For example, the one or more processors 602 may obtain a map with an environment type mask or polygon that indicates GNSS reception conditions at different positions, which may be compared to the current position. The one or more processors 602 may be configured to consider the GNSS signal parameters to determine if the differential corrections may be useful. For example, signal parameters, such as whether the GNSS signals include multipath components, or an indication of the GNSS signals being jammed, or whether the SNR of the GNSS signals is less than a predetermined threshold. The one or more processors 602 may be configured to determine if the differential corrections may be useful based on improvements of a position determination using the differential corrections relative to position determination without the differential corrections. For example, the one or more processors may determine if the magnitude of uncertainty or error is reduced with used of differential corrections (or reduced by more than a predetermined threshold amount) to determine whether the differential corrections may be useful.

The one or more processors 602, for example, may determine whether to interrupt the use of differential corrections by being configured to receive from the DGNSS server an indication to stop using the differential corrections, via the wireless transceiver 610 or wireless transceiver 612. For example, the indication to stop using the differential corrections may be an indication to disconnect from the DGNSS server to stop receiving broadcast differential corrections, or to stop using differential corrections, if received, in position determination.

The one or more processors 602 may be configured to determine and monitor an amount of time to interrupt the use of the differential corrections, e.g., as a predetermined amount of time, or by receiving the amount of time from the DGNSS server. The one or more processors 602 may be configured to determine periodically if the differential corrections should be used again, e.g., by reevaluating whether the differential corrections are useful or by receiving an indication from the DGNSS server to being using the differential corrections again.

The medium 620 and/or memory 604 may include a positioning module 630 that when implemented by the one or more processors 602 configures the one or more processors 602 to determine a position for the terminal based on the GNSS signals and the differential corrections or based on the GNSS signals without the differential corrections if the use of differential corrections has been interrupted, e.g., the terminal has disconnected from the DGNSS server so that the differential corrections are not received or differential corrections that are received are ignored. In some implementations, the one or more processors 602 may be configured as a position engine to determine the position of the terminal, and in other implantations, the one or more processors 602 may be configured to send the GNSS signals and differential corrections (if applicable) to a location server to determine the position of the terminal.

The medium 620 and/or memory 604 may include a capabilities module 632 that when implemented by the one or more processors 602 configures the one or more processors 602 to send to the DGNSS server an indication of the DGNSS capabilities of the terminal, via the wireless transceiver 610 or wireless transceiver 612. The DGNSS capabilities, for example, may include one or more of the GNSS constellations, and frequencies, or a combination thereof, from which the terminal is capable of receiving GNSS signals.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support positioning using differential GNSS in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a wireless transceiver 610 or wireless transceiver 612 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
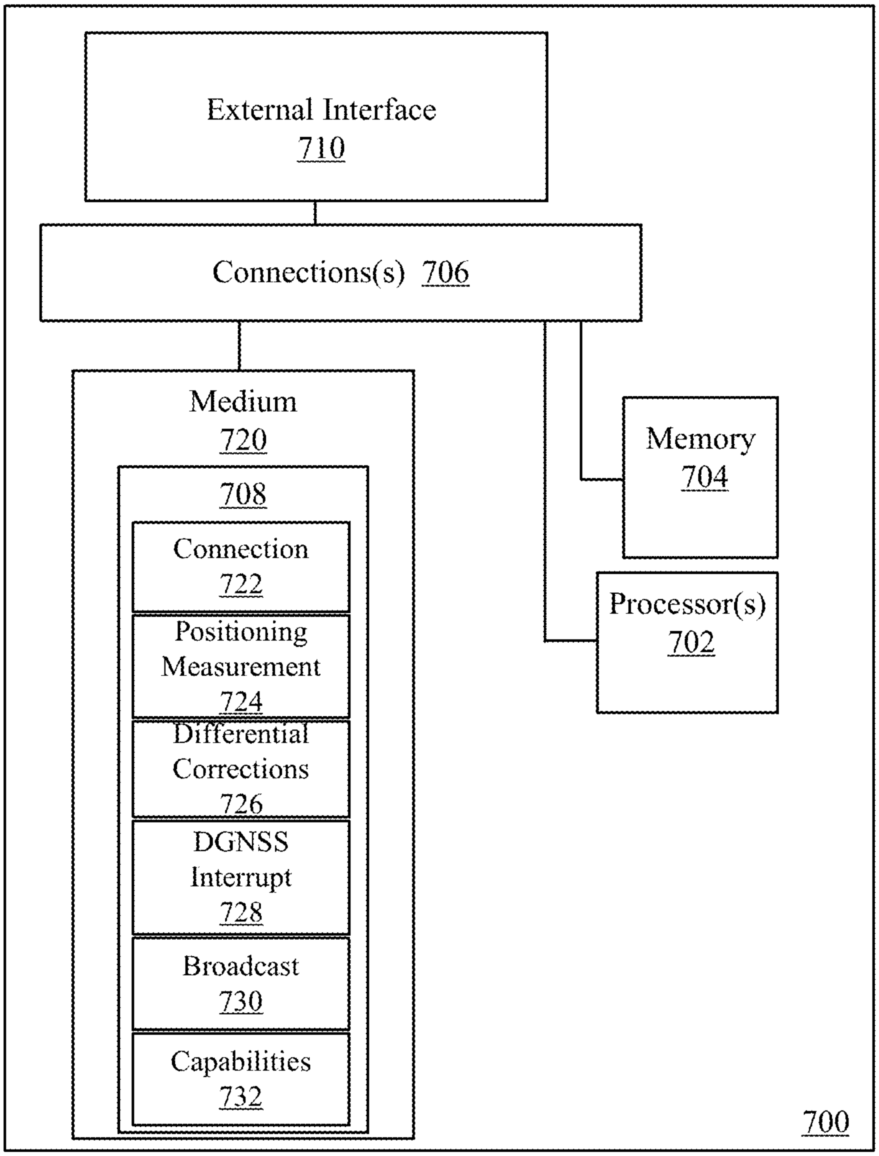
FIG. 7 shows a schematic block diagram illustrating certain exemplary features of a server for supporting positioning using differential GNSS, as described herein.

FIG. 7 shows a schematic block diagram illustrating certain exemplary features of a server 700, e.g., such as DGNSS server 120 shown in FIGS. 1-5, that is enabled to support positioning of the UE using DGNSS as discussed herein. Server 700 may perform the signal flows 300, 400, or 500 shown in respective FIG. 3, 4, or 5 and the process flows 900 and 1100 shown in respective FIGS. 9 and 11. Server 700 may, for example, include one or more processors 702, memory 704, an external interface 710, which may be a wireline or wireless network interface to network 150 and base stations 140 shown in FIG. 1, which may be operatively coupled with one or more connections 706 (e.g., buses, lines, fibers, links, etc.) to non-transitory computer readable medium 720 and memory 704. The server 700 may further include additional items, which are not shown, such as a user interface that may include e.g., a display, a keypad or other input device, such as virtual keypad on the display, through which a user may interface. In certain example implementations, all or part of server 700 may take the form of a chipset, and/or the like.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of server 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in server 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in server 700 is merely exemplary, and as such the functionality of the modules and/or data structures may be combined, separated, and/or be structured in different ways depending upon the implementation of the server 700.

The medium 720 and/or memory 704 may include a connection module 722 that when implemented by the one or more processors 702 configures the one or more processors 702 to wirelessly connect with terminal, such as terminal 105 shown in FIG. 1, via the external interface 710, to provide the terminal with differential corrections generated by a reference station for GNSS signals. The wireless connection with the terminal, for example, may be through base stations 140 and network 150, as illustrated in FIG. 1. The one or more processors 702 may be further configured to disconnect the wireless connection with the terminal.

The medium 720 and/or memory 704 may include a positioning information module 724 that when implemented by the one or more processors 702 configures the one or more processors 702 to receive, via the external interface 710, GNSS signals received by the terminal. The one or more processors 702 may be further configured to receive additional information from the terminal, such as a determined position, environmental conditions determined, and determined GNSS signal parameters, such as an indication of multipath components in the GNSS signals, an indication of jamming of the GNSS signals, a signal to noise ratio of the GNSS signals, a list of satellites, base stations, and/or APs visible to the terminal, etc.

The medium 720 and/or memory 704 may include a differential corrections module 726 that when implemented by the one or more processors 702 configures the one or more processors 702 to receive, via the external interface 710, differential corrections generated by a reference station for the GNSS signals.

The medium 720 and/or memory 704 may include a DGNSS interrupt module 728 that when implemented by the one or more processors 702 configures the one or more processors 702 to determines whether to interrupt the use of differential corrections from a reference station. For example, the one or more processors 702 may be configured to determine whether to stop the use of differential corrections, i.e., to have the terminal disconnect from the DGNSS server so that differential corrections are not received or not use the differential corrections, if received, in positioning measurements.

The one or more processors 702, for example, may determine whether to interrupt the use of differential corrections if a GNSS position determination will not be improved if differential corrections are used. For example, as described herein, the one or more processors may be configured to use one or more factors to determine whether the differential corrections are useful. For instance, the one or more processors 702 may be configured to consider the environment in which it is located, e.g., whether the terminal is in a tunnel, a garage, or indoors, or greater than a threshold distance from the reference station, to determine whether the differential corrections will not improve the position determination. The one or more processors 702 for example may be configured to determine the environment in which the terminal is located based on sensor information received from the terminal, such as the list of satellites, base stations, and/or APs visible to the terminal, or signal strength and whether there has been suddenly changes which may indicate a transition from blocked conditions or unblocked conditions. The one or more processors 702 may be configured to consider the environmental conditions for a current position of the terminal to determine if the differential corrections may be useful. For example, the one or more processors 702 may obtain a map with an environment type mask or polygon that indicates GNSS reception conditions at different positions, which may be compared to the current position of the terminal as provided by the terminal. The one or more processors 702 may be configured to consider the GNSS signal parameters provided by the terminal to determine if the differential corrections may be useful. For example, signal parameters, such as whether the GNSS signals include multipath components, or an indication of the GNSS signals being jammed, or whether the SNR of the GNSS signals is less than a predetermined threshold. The one or more processors 702 may be configured to determine if the differential corrections may be useful based on improvements of a position determination using the differential corrections relative to position determination without the differential corrections. For example, the one or more processors may determine if the magnitude of uncertainty or error is reduced with used of differential corrections (or reduced by more than a predetermined threshold amount) to determine whether the differential corrections may be useful.

The one or more processors 702, for example, may determine whether to interrupt the use of differential corrections by being configured to send to the terminal an indication to stop using the differential corrections, via the external interface 710. For example, the indication to stop using the differential corrections may be an indication to disconnect from the DGNSS server to stop receiving broadcast differential corrections, or to stop using differential corrections, if received, in position determination.

The one or more processors 702 may be configured to determine and monitor an amount of time to interrupt the use of the differential corrections, e.g., as a predetermined amount of time, or by sending the amount of time to the terminal. The one or more processors 702 may be configured to determine periodically if the differential corrections should be used again, e.g., by reevaluating whether the differential corrections are useful or by receiving an indication from the DGNSS server to being using the differential corrections again. The one or more processors 702 may be configured to send an indication to the terminal to begin using the differential corrections again, e.g. by reconnecting with the DGNSS server or to use the differential corrections in positioning determination.

The medium 720 and/or memory 704 may include a broadcast module 730 that when implemented by the one or more processors 702 configures the one or more processors 702 to broadcast to the terminal the differential corrections generated by the reference station for the GNSS signals.

The medium 720 and/or memory 704 may include a capabilities module 732 that when implemented by the one or more processors 702 configures the one or more processors 702 to receive from the terminal an indication of the DGNSS capabilities of the terminal, via the external interface 710. The DGNSS capabilities, for example, may include one or more of the GNSS constellations, and frequencies, or a combination thereof, from which the terminal is capable of receiving GNSS signals. The one or more processors 702 may be further configured to select differential corrections to be broadcast to the terminal based on the DGNSS capabilities of the terminal.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support positioning of a terminal using differential GNSS in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
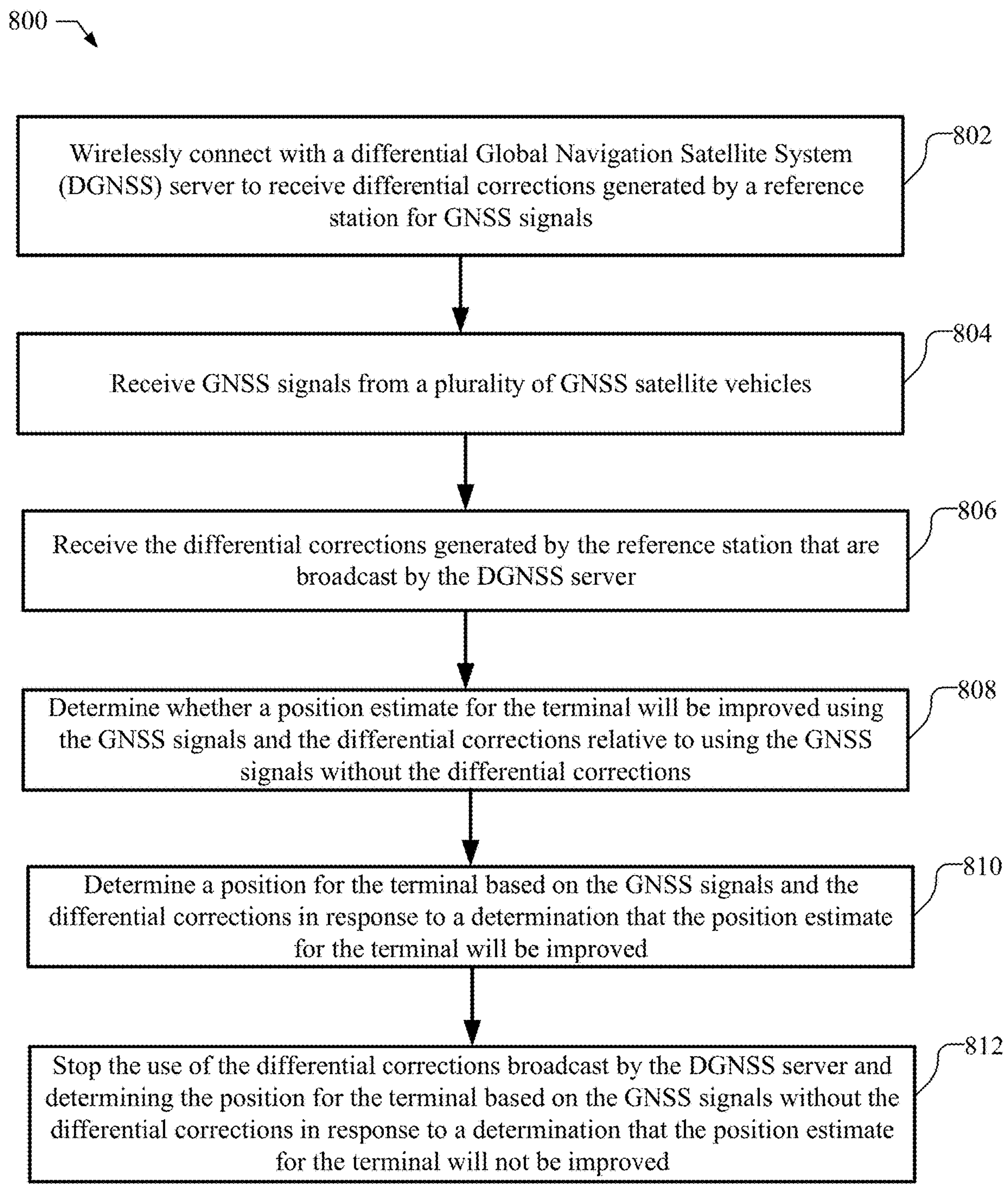
FIG. 8 shows a flow diagram for an exemplary process performed by a terminal for positioning using differential GNSS, as described herein.

FIG. 8 shows a flow diagram for an exemplary process 800 performed by a terminal for positioning, in a manner consistent with disclosed implementations. The terminal, for example, may be the terminal 105 shown in FIGS. 1-5 or terminal 600 shown in FIG. 6.

At block 802, the terminal may wirelessly connect with a differential Global Navigation Satellite System (DGNSS) server to receive differential corrections generated by a reference station for GNSS signals, e.g., as discussed at stage 1 of FIG. 3. A means for wirelessly connecting with a differential Global Navigation Satellite System (DGNSS) server to receive differential corrections generated by a reference station for GNSS signals may include, e.g., the wireless transceiver 610 or wireless transceiver 612 and one or more processors 602 with dedicated hardware or implementing executable code or software instructions in memory 604 and/or medium 620 in terminal 600, such as the connection module 622, shown in FIG. 6.

At block 804, the terminal receives GNSS signals from a plurality of GNSS satellite vehicles, e.g., as discussed at stage 2A of FIG. 3. A means for receiving GNSS signals from a plurality of GNSS satellite vehicles may include, e.g., the SPS receiver 615 and one or more processors 602 with dedicated hardware or implementing executable code or software instructions in memory 604 and/or medium 620 in terminal 600, such as the SPS module 624, shown in FIG. 6.

At block 806, the terminal receives the differential corrections generated by the reference station that are broadcast by the DGNSS server, as discussed at stage 3B of FIG. 3. A means for receiving the differential corrections generated by the reference station that are broadcast by the DGNSS server may include, e.g., the wireless transceiver 610 or wireless transceiver 612 and one or more processors 602 with dedicated hardware or implementing executable code or software instructions in memory 604 and/or medium 620 in terminal 600, such as the DGNSS module 626, shown in FIG. 6.

At block 808, the terminal determines whether a position estimate for the terminal will be improved using the GNSS signals and the differential corrections relative to using the GNSS signals without the differential corrections, e.g., as discussed at stage 4 of FIG. 3. A means for determining whether a position estimate for the terminal will be improved using the GNSS signals and the differential corrections relative to using the GNSS signals without the differential corrections may include, e.g., the one or more processors 602 with dedicated hardware or implementing executable code or software instructions in memory 604 and/or medium 620 in terminal 600, such as the DGNSS interrupt module 628, shown in FIG. 6.

At block 810, the terminal determines a position for the terminal based on the GNSS signals and the differential corrections in response to a determination that the position estimate for the terminal will be improved, e.g., e.g., as discussed at stage 5 of FIG. 3. A means for determining a position for the terminal based on the GNSS signals and the differential corrections in response to a determination that the position estimate for the terminal will be improved may include, e.g., the one or more processors 602 with dedicated hardware or implementing executable code or software instructions in memory 604 and/or medium 620 in terminal 600, such as the positioning module 630, shown in FIG. 6.

At block 812, the terminal stops the use of differential corrections broadcast by the DGNSS server and determining the position for the terminal based on the GNSS signals without the differential corrections in response to a determination that the position estimate for the terminal will not be improved, e.g., as discussed at stages 6 and 7 of FIG. 3. A means for stopping the use of differential corrections broadcast by the DGNSS server and determining the position for the terminal based on the GNSS signals without the differential corrections in response to a determination that the position estimate for the terminal will not be improved may include, e.g., the wireless transceiver 610 or wireless transceiver 612 and one or more processors 602 with dedicated hardware or implementing executable code or software instructions in memory 604 and/or medium 620 in terminal 600, such as the connection module 622 and the positioning module 630, shown in FIG. 6.

In some implementations, the terminal may stop the use of the differential corrections by continuing to receive the differential corrections broadcast by the DGNSS server and not using the differential corrections for determining the position for the terminal, e.g., as discussed at stages 6 and 7 of FIG. 3. A means for continuing to receive the differential corrections broadcast by the DGNSS server and not using the differential corrections for determining the position for the terminal may include, e.g., the wireless transceiver 610 or wireless transceiver 612 and one or more processors 602 with dedicated hardware or implementing executable code or software instructions in memory 604 and/or medium 620 in terminal 600, such as the positioning module 630, shown in FIG. 6.

In some implementations, the terminal may stop the use of the differential corrections by disconnecting from the DGNSS server, e.g., so that the differential corrections broadcast by the DGNSS server are not received, e.g., as discussed at stages 6 and 7 of FIG. 3. A means for disconnecting from the DGNSS server may include, e.g., the wireless transceiver 610 or wireless transceiver 612 and one or more processors 602 with dedicated hardware or implementing executable code or software instructions in memory 604 and/or medium 620 in terminal 600, such as the connection module 622, shown in FIG. 6.

In some implementations, the terminal may, after disconnecting from the DGNSS server, wirelessly reconnect with the DGNSS server at a later time to receive the differential corrections, e.g., as discussed at stage 8, and may determine the position for the terminal based on the GNSS signals and the differential corrections after wirelessly reconnecting with the DGNSS server, e.g., as discussed at stage 9. A means for wirelessly reconnecting with the DGNSS server at a later time to receive the differential corrections may include, e.g., the wireless transceiver 610 or wireless transceiver 612 and one or more processors 602 with dedicated hardware or implementing executable code or software instructions in memory 604 and/or medium 620 in terminal 600, such as the connection module 622, shown in FIG. 6. In one example, the terminal may reconnect with the DGNSS server at the later time is performed after a predetermined amount of time, e.g., as discussed at stage 8. In one example, the terminal may reconnect with the DGNSS server at the later time after determining that the position estimate for the terminal will be improved using the GNSS signals and the differential corrections relative to using the GNSS signals without differential corrections, e.g., as discussed at stage 8. A means for determining the position for the terminal based on the GNSS signals and the differential corrections after wirelessly reconnecting with the DGNSS server may include, e.g., the one or more processors 602 with dedicated hardware or implementing executable code or software instructions in memory 604 and/or medium 620 in terminal 600, such as the positioning module 630, shown in FIG. 6.

In one implementation, the terminal may determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof, e.g., as discussed at stage 4.

In one implementation, the terminal may determine whether the position estimate for the terminal will be improved using the GNSS signals and the differential corrections relative to using the GNSS signals without the differential corrections based on a first position determined using the GNSS signals and the differential corrections and a second position determined using the GNSS signals without the differential corrections, e.g., as discussed at stage 4.

In one implementation, the terminal may determine whether the position estimate for the terminal will be improved using the GNSS signals and the differential corrections relative to using the GNSS signals without the differential corrections based on environmental conditions of a current position of the terminal, e.g., as discussed at stage 4.

Figure 9:
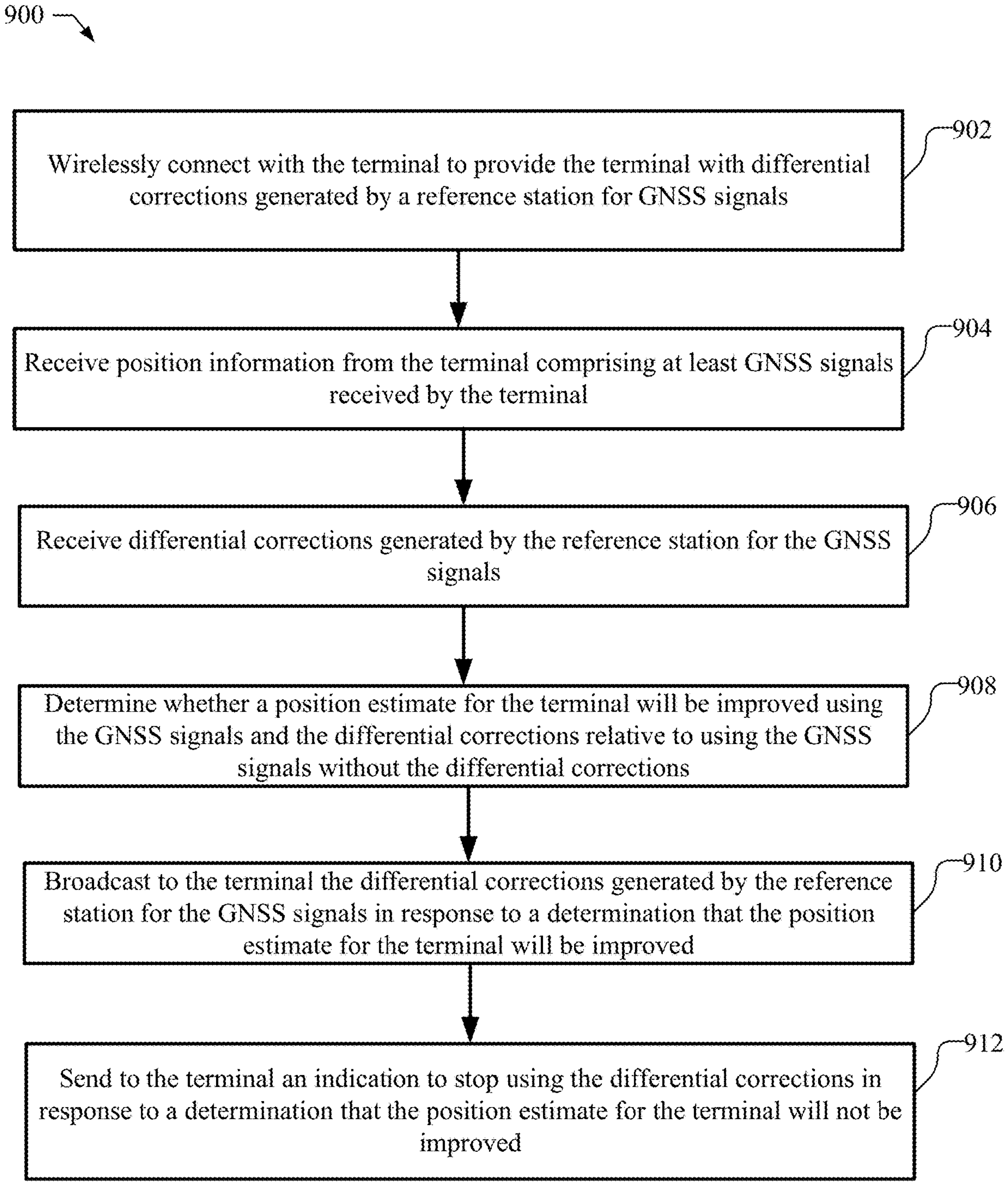
FIG. 9 shows a flow diagram for an exemplary process performed by a DGNSS server for positioning a terminal using differential GNSS, as described herein.

FIG. 9 shows a flow diagram for an exemplary process 900 performed by a DGNSS server for positioning a terminal, in a manner consistent with disclosed implementations. The DGNSS server, for example, may be the server 120 shown in FIGS. 1-5 or server 700 shown in FIG. 7.

At block 902, the DGNSS server may wirelessly connect with the terminal to provide the terminal with differential corrections generated by a reference station for GNSS signals, e.g., as discussed at stage 1 of FIG. 4. A means for may include, e.g., the external interface 710 and one or more processors 702 with dedicated hardware or implementing executable code or software instructions in memory 704 and/or medium 720 in server 700, such as the connection module 722, shown in FIG. 7.

At block 904, the DGNSS server may receive position information from the terminal comprising at least GNSS signals received by the terminal, e.g., as discussed at stage 5 of FIG. 4. A means for receiving position information from the terminal comprising at least GNSS signals received by the terminal may include, e.g., the external interface 710 and one or more processors 702 with dedicated hardware or implementing executable code or software instructions in memory 704 and/or medium 720 in server 700, such as the positioning measurement module 724, shown in FIG. 7.

At block 906, the DGNSS server may receive differential corrections generated by the reference station for the GNSS signals, e.g., as discussed at stage 3A of FIG. 4. A means for receiving differential corrections generated by the reference station for the GNSS signals may include, e.g., the external interface 710 and one or more processors 702 with dedicated hardware or implementing executable code or software instructions in memory 704 and/or medium 720 in server 700, such as the differential corrections module 726, shown in FIG. 7.

At block 908, the DGNSS server may determine whether a position estimate for the terminal will be improved using the GNSS signals and the differential corrections relative to using the GNSS signals without the differential corrections, e.g., as discussed at stage 6 of FIG. 4. A means for determining whether a position estimate for the terminal will be improved using the GNSS signals and the differential corrections relative to using the GNSS signals without the differential corrections may include, e.g., the one or more processors 702 with dedicated hardware or implementing executable code or software instructions in memory 704 and/or medium 720 in server 700, such as the DGNSS interrupt module 728, shown in FIG. 7.

At block 910, the DGNSS server may broadcast to the terminal the differential corrections generated by the reference station for the GNSS signals in response to a determination that the position estimate for the terminal will be improved, e.g., as discussed at stage 3B of FIG. 4. A means for broadcasting to the terminal the differential corrections generated by the reference station for the GNSS signals in response to a determination that the position estimate for the terminal will be improved may include, e.g., the external interface 710 and one or more processors 702 with dedicated hardware or implementing executable code or software instructions in memory 704 and/or medium 720 in server 700, such as the broadcast module 730, shown in FIG. 7.

At block 912, the DGNSS server may send to the terminal an indication to stop using the differential corrections in response to a determination that the position estimate for the terminal will not be improved, e.g., as discussed at stage 7 of FIG. 4. A means for sending to the terminal an indication to stop using the differential corrections in response to a determination that the position estimate for the terminal will not be improved may include, e.g., the external interface 710 and one or more processors 702 with dedicated hardware or implementing executable code or software instructions in memory 704 and/or medium 720 in server 700, such as the DGNSS interrupt module 728, shown in FIG. 7.

In some implementations, the indication to stop using the differential corrections may be an indication to not use the differential corrections for determining the position for the terminal, e.g., as discussed at stage 7 of FIG. 4. In some implementations, the indication to stop using the differential corrections may be an indication to disconnect from the DGNSS server, e.g., so that the terminal does not receive differential corrections broadcast by the DGNSS server, e.g., as discussed at stages 7 and 8 of FIG. 4.

In some implementations, the DGNSS server may send with the indication to stop using the differential corrections an indication of an amount of time to delay before using the differential corrections, e.g., as discussed at stages 7 and 11A of FIG. 4. A means for sending with the indication to stop using the differential corrections an indication of an amount of time to delay before using the differential corrections may include, e.g., the external interface 710 and one or more processors 702 with dedicated hardware or implementing executable code or software instructions in memory 704 and/or medium 720 in server 700, such as the DGNSS interrupt module 728, shown in FIG. 7.

In some implementations, the DGNSS server may send to the terminal an indication to begin using the differential corrections again after sending the indication to stop using the differential corrections, e.g., as discussed at stage 12 of FIG. 4. A means for sending to the terminal an indication to begin using the differential corrections again after sending the indication to stop using the differential corrections may include, e.g., the external interface 710 and one or more processors 702 with dedicated hardware or implementing executable code or software instructions in memory 704 and/or medium 720 in server 700, such as the DGNSS interrupt module 728, shown in FIG. 7. For example, in some implementations, the indication to begin using the differential corrections again may be sent a predetermined amount of time after sending the indication to stop using the differential corrections, e.g., as discussed at stages 11B and 12 of FIG. 4. In some implementations, the indication to begin using the differential corrections again may be sent after determining that the position estimate for the terminal will be improved using the GNSS signals and the differential corrections from the reference station relative to using the GNSS signals without the differential corrections, e.g., as discussed at stages 11B and 12 of FIG. 4.

In some implementations, the DGNSS server may determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof, e.g., as discussed at stage 6 of FIG. 4.

In some implementations, the DGNSS server may determine whether the position estimate for the terminal will be improved using the GNSS signals and the differential corrections relative to using the GNSS signals without the differential corrections based on a first position determined using the GNSS signals and the differential corrections and a second position determined using the GNSS signals without the differential corrections, e.g., as discussed at stage 6 of FIG. 4.

In some implementations, the DGNSS server may determine whether the position estimate for the terminal will be improved using the GNSS signals and the differential corrections relative to using the GNSS signals without the differential corrections is based on environmental conditions of a current position of the terminal, e.g., as discussed at stage 6 of FIG. 4.

Figure 10:
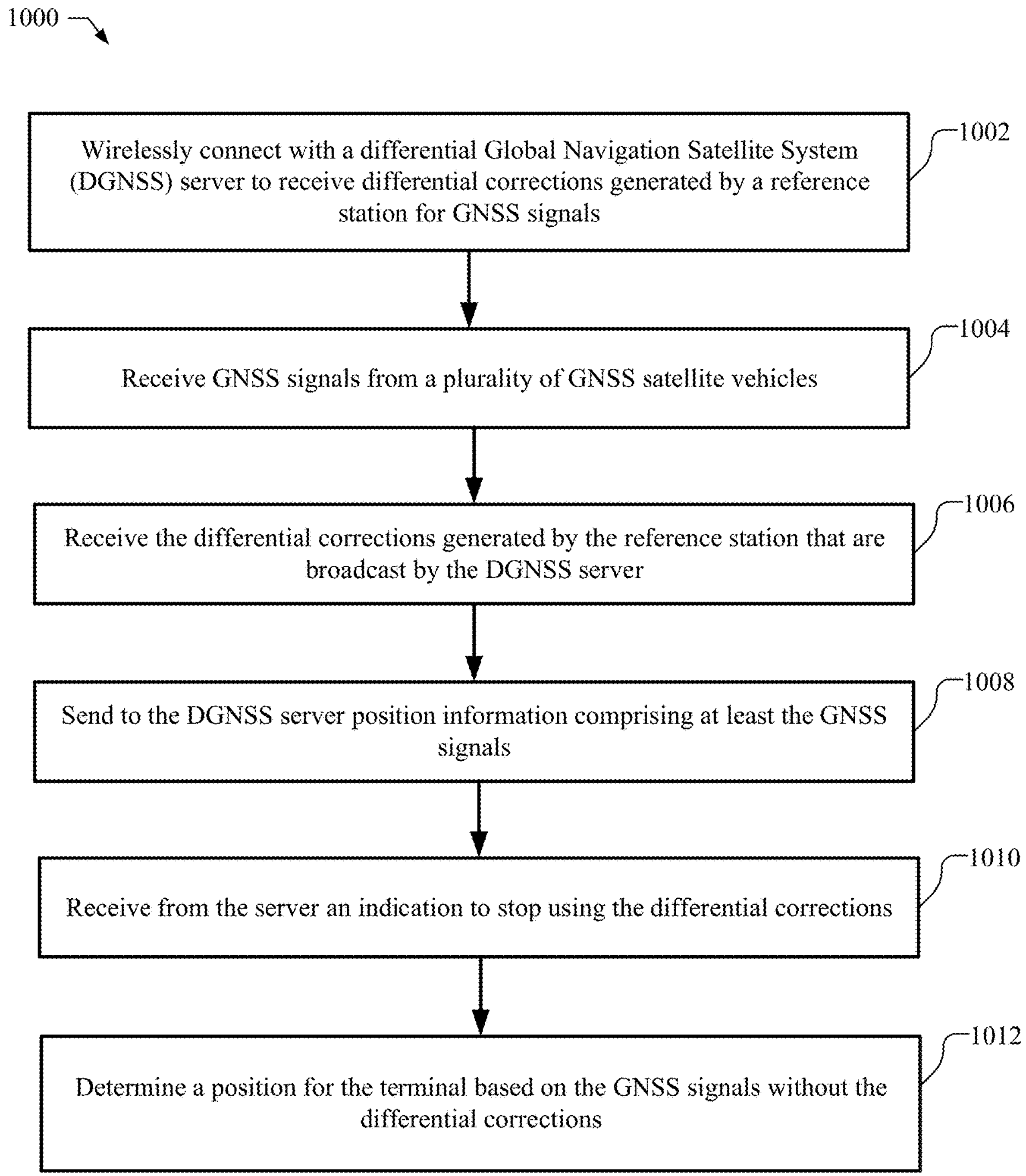
FIG. 10 shows a flow diagram for an exemplary process performed by a terminal for positioning using differential GNSS, as described herein.

FIG. 10 shows a flow diagram for an exemplary process 1000 performed by a terminal for positioning, in a manner consistent with disclosed implementations. The terminal, for example, may be the terminal 105 shown in FIGS. 1-5 or terminal 600 shown in FIG. 6.

At block 1002, the terminal may wirelessly connect with a differential Global Navigation Satellite System (DGNSS) server to receive differential corrections generated by a reference station for GNSS signals, e.g., as discussed at stage 1 of FIG. 4. A means for wirelessly connecting with a differential Global Navigation Satellite System (DGNSS) server to receive differential corrections generated by a reference station for GNSS signals may include, e.g., the wireless transceiver 610 or wireless transceiver 612 and one or more processors 602 with dedicated hardware or implementing executable code or software instructions in memory 604 and/or medium 620 in terminal 600, such as the connection module 622, shown in FIG. 6.

At block 1004, the terminal may receive GNSS signals from a plurality of GNSS satellite vehicles, e.g., as discussed at stage 2A of FIG. 4. A means for receiving GNSS signals from a plurality of GNSS satellite vehicles may include, e.g., the SPS receiver 615 and one or more processors 602 with dedicated hardware or implementing executable code or software instructions in memory 604 and/or medium 620 in terminal 600, such as the SPS module 624, shown in FIG. 6.

At block 1006, the terminal may receive the differential corrections generated by the reference station that are broadcast by the DGNSS server, e.g., as discussed at stage 3B of FIG. 4. A means for receiving the differential corrections generated by the reference station that are broadcast by the DGNSS server may include, e.g., the wireless transceiver 610 or wireless transceiver 612 and one or more processors 602 with dedicated hardware or implementing executable code or software instructions in memory 604 and/or medium 620 in terminal 600, such as the DGNSS module 626, shown in FIG. 6.

At block 1008, the terminal may send to the DGNSS server position information comprising at least the GNSS signals, e.g., as discussed at stage 5 of FIG. 4. A means for sending to the DGNSS server position information comprising at least the GNSS signals may include, e.g., the wireless transceiver 610 or wireless transceiver 612 and one or more processors 602 with dedicated hardware or implementing executable code or software instructions in memory 604 and/or medium 620 in terminal 600, such as the DGNSS module 626, shown in FIG. 6.

At block 1010, the terminal may receive from the server an indication to stop using the differential corrections, e.g., as discussed at stage 7 of FIG. 4. A means for receiving from the server an indication to stop using the differential corrections may include, e.g., the wireless transceiver 610 or wireless transceiver 612 and one or more processors 602 with dedicated hardware or implementing executable code or software instructions in memory 604 and/or medium 620 in terminal 600, such as the DGNSS interrupt module 628, shown in FIG. 6.

At block 1012, the terminal may determine a position for the terminal based on the GNSS signals without the differential corrections, e.g., as discussed at stage 9 of FIG. 4. A means for determining a position for the terminal based on the GNSS signals without the differential corrections may include, e.g., the one or more processors 602 with dedicated hardware or implementing executable code or software instructions in memory 604 and/or medium 620 in terminal 600, such as the positioning module 630, shown in FIG. 6.

In one implementation, the indication to stop using the differential corrections may include an indication to not use the differential corrections for determining the position for the terminal, as discussed at stage 7 of FIG. 4.

In one implementation, the indication to stop using the differential corrections may include an indication to disconnect from the DGNSS server, e.g., so that the terminal does not receive differential corrections broadcast by the DGNSS server, and the terminal may disconnect from the DGNSS server, e.g., as discussed at stage 8 of FIG. 4. A means for disconnecting from the DGNSS server may include, e.g., the wireless transceiver 610 or wireless transceiver 612 and one or more processors 602 with dedicated hardware or implementing executable code or software instructions in memory 604 and/or medium 620 in terminal 600, such as the connection module 622, shown in FIG. 6. The terminal may receive additional GNSS signals from the plurality of GNSS satellite vehicles after disconnecting from the reference station, e.g., as discussed at stages 2A and 9 of FIG. 4, and may send to the DGNSS server position information comprising the additional GNSS signals, e.g., as discussed at stage 10. A means for receiving additional GNSS signals from the plurality of GNSS satellite vehicles after disconnecting from the reference station may include, e.g., the SPS receiver 615 and one or more processors 602 with dedicated hardware or implementing executable code or software instructions in memory 604 and/or medium 620 in terminal 600, such as the SPS module 624, shown in FIG. 6. A means for sending to the DGNSS server position information comprising the additional GNSS signals may include, e.g., the wireless transceiver 610 or wireless transceiver 612 and one or more processors 602 with dedicated hardware or implementing executable code or software instructions in memory 604 and/or medium 620 in terminal 600, such as the DGNSS module 626, shown in FIG. 6.

In one implementation, the indication to stop using the differential corrections is sent by the DGNSS server after the DGNSS server determines that the position estimate for the terminal will not be improved using the GNSS signals and the differential corrections relative to using the GNSS signals without the differential corrections, as discussed at stage 6 and 7 of FIG. 4.

In one implementation, the terminal may receive from the DGNSS server an indication of an amount of time to delay before using the differential corrections again with the indication to stop using the differential corrections, e.g., as discussed at stage 7 of FIG. 4, and may use the differential corrections again after the expiration of the amount of time, e.g., as discussed at stage 13 of FIG. 4. A means for receiving from the DGNSS server an indication of an amount of time to delay before using the differential corrections again with the indication to stop using the differential corrections may include, e.g., the wireless transceiver 610 or wireless transceiver 612 and one or more processors 602 with dedicated hardware or implementing executable code or software instructions in memory 604 and/or medium 620 in terminal 600, such as the DGNSS interrupt module 628, shown in FIG. 6. A means for using the differential corrections again after the expiration of the amount of time may include, e.g., the one or more processors 602 with dedicated hardware or implementing executable code or software instructions in memory 604 and/or medium 620 in terminal 600, such as the positioning module 630, shown in FIG. 6.

In one implementation, the terminal may receive from the DGNSS server an indication to begin using the differential corrections again after receiving the indication to stop using the differential corrections, e.g., as discussed at stage 12 of FIG. 4, and may use the differential corrections again in response to the indication to begin using the differential corrections again, e.g., as discussed at stage 13 of FIG. 4. A means for receiving from the DGNSS server an indication to begin using the differential corrections again after receiving the indication to stop using the differential corrections may include, e.g., the wireless transceiver 610 or wireless transceiver 612 and one or more processors 602 with dedicated hardware or implementing executable code or software instructions in memory 604 and/or medium 620 in terminal 600, such as the DGNSS interrupt module 628, shown in FIG. 6. A means for using the differential corrections again in response to the indication to begin using the differential corrections again may include, e.g., the one or more processors 602 with dedicated hardware or implementing executable code or software instructions in memory 604 and/or medium 620 in terminal 600, such as the positioning module 630, shown in FIG. 6. For example, in one implementation, the indication to begin using the differential corrections again may be sent by the DGNSS server a predetermined amount of time after the indication to stop using the differential corrections is sent, e.g., as discussed at stages 11B and 12. In one implementation, the indication to begin using the differential corrections again may be sent by the DGNSS server after the DGNSS server determines that the position estimate for the terminal will be improved using the GNSS signals and the differential corrections from the reference station relative to using the GNSS signals without the differential corrections, e.g., as discussed at stages 11B and 12.

Figure 11:
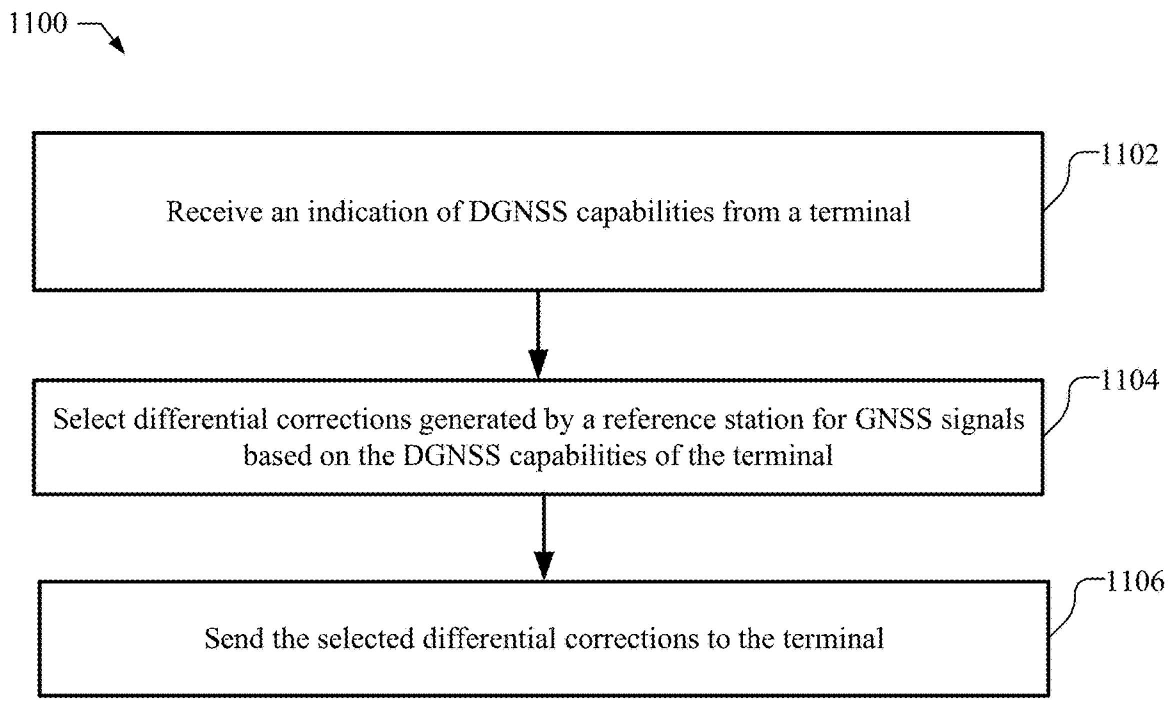
FIG. 11 shows a flow diagram for an exemplary process performed by a DGNSS server for positioning a terminal using differential GNSS, as described herein.

FIG. 11 shows a flow diagram for an exemplary process 1100 performed by a DGNSS server for positioning a terminal, in a manner consistent with disclosed implementations. The DGNSS server, for example, may be the server 120 shown in FIGS. 1-5 or server 700 shown in FIG. 7.

At block 1102, the DGNSS server may receive an indication of DGNSS capabilities from a terminal, e.g., as discussed at stage 2 of FIG. 5. A means for receiving an indication of DGNSS capabilities from a terminal may include, e.g., the external interface 710 and one or more processors 702 with dedicated hardware or implementing executable code or software instructions in memory 704 and/or medium 720 in server 700, such as the capabilities module 732, shown in FIG. 7.

At block 1104, the DGNSS server may select differential corrections generated by a reference station for GNSS signals based on the DGNSS capabilities of the terminal, e.g., as discussed at stage 4B of FIG. 5. A means for selecting differential corrections generated by a reference station for GNSS signals based on the DGNSS capabilities of the terminal may include, e.g., the external interface 710 and one or more processors 702 with dedicated hardware or implementing executable code or software instructions in memory 704 and/or medium 720 in server 700, such as the capabilities module 732 and the differential corrections module 726, shown in FIG. 7.

At block 1106, the DGNSS server may send the selected differential corrections to the terminal, e.g., as discussed at stage 4B of FIG. 5. A means for sending the selected differential corrections to the terminal may include, e.g., the external interface 710 and one or more processors 702 with dedicated hardware or implementing executable code or software instructions in memory 704 and/or medium 720 in server 700, such as the differential corrections module 726, shown in FIG. 7.

In one implementation, the DGNSS capabilities of the terminal may include an indication of at least one of constellation, frequencies, or a combination thereof, that the terminal is capable of receiving GNSS signals, e.g., as discussed at stage 2 of FIG. 5.

Figure 12:
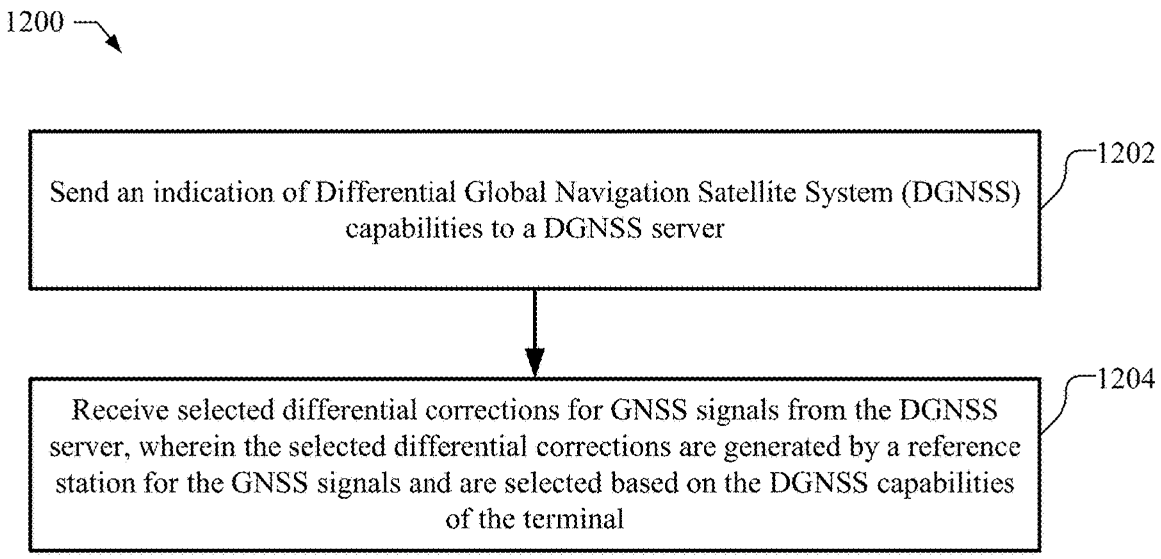
FIG. 12 shows a flow diagram for an exemplary process performed by a terminal for positioning using differential GNSS, as described herein.

FIG. 12 shows a flow diagram for an exemplary process 1200 performed by a terminal for positioning, in a manner consistent with disclosed implementations. The terminal, for example, may be the terminal 105 shown in FIGS. 1-5 or terminal 600 shown in FIG. 6.

At block 1202, the terminal may send an indication of Differential Global Navigation Satellite System (DGNSS) capabilities to a DGNSS server, e.g., as discussed at stage 2 of FIG. 5. In one implementation, the DGNSS capabilities of the terminal may include an indication of at least one of constellation, frequencies, or a combination thereof, that the terminal is capable of receiving GNSS signals, e.g., as discussed in stage 4B of FIG. 5. A means for sending an indication of Differential Global Navigation Satellite System (DGNSS) capabilities to a DGNSS server; and may include, e.g., the wireless transceiver 610 or wireless transceiver 612 and one or more processors 602 with dedicated hardware or implementing executable code or software instructions in memory 604 and/or medium 620 in terminal 600, such as the capabilities module 632, shown in FIG. 6.

At block 1204, the terminal may receive selected differential corrections for GNSS signals from the DGNSS server, wherein the selected differential corrections are generated by a reference station for the GNSS signals and are selected based on the DGNSS capabilities of the terminal, e.g., as discussed at stage 4B of FIG. 5. A means for receiving selected differential corrections for GNSS signals from the DGNSS server, wherein the selected differential corrections are generated by a reference station for the GNSS signals and are selected based on the DGNSS capabilities of the terminal may include, e.g., the wireless transceiver 610 or wireless transceiver 612 and one or more processors 602 with dedicated hardware or implementing executable code or software instructions in memory 604 and/or medium 620 in terminal 600, such as the DGNSS module 626, shown in FIG. 6, shown in FIG. 6.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, nonvolatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered aspects:

Aspect 1. A method performed by a terminal for positioning, the method comprising: wirelessly connecting with a differential Global Navigation Satellite System (DGNSS) server to receive differential corrections generated by a reference station for GNSS signals; receiving GNSS signals from a plurality of GNSS satellite vehicles; receiving the differential corrections generated by the reference station that are broadcast by the DGNSS server; determining whether a position estimate for the terminal will be improved using the GNSS signals and the differential corrections relative to using the GNSS signals without the differential corrections; determining a position for the terminal based on the GNSS signals and the differential corrections in response to a determination that the position estimate for the terminal will be improved; and stopping the use of differential corrections broadcast by the DGNSS server and determining the position for the terminal based on the GNSS signals without the differential corrections in response to a determination that the position estimate for the terminal will not be improved.

Aspect 2. The method of aspect 1, wherein stopping the use of the differential corrections comprises continuing to receive the differential corrections broadcast by the DGNSS server and not using the differential corrections for determining the position for the terminal.

Aspect 3. The method of aspect 1, wherein stopping the use of the differential corrections comprises disconnecting from the DGNSS server.

Aspect 4. The method of aspect 3, further comprising: after disconnecting from the DGNSS server, wirelessly reconnecting with the DGNSS server at a later time to receive the differential corrections; and determining the position for the terminal based on the GNSS signals and the differential corrections after wirelessly reconnecting with the DGNSS server.

Aspect 5. The method of aspect 4, wherein reconnecting with the DGNSS server at the later time is performed after a predetermined amount of time.

Aspect 6. The method of aspect 4, wherein reconnecting with the DGNSS server at the later time is performed after determining that the position estimate for the terminal will be improved using the GNSS signals and the differential corrections relative to using the GNSS signals without the differential corrections.

Aspect 7. The method of any of aspects 1-6, wherein determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 8. The method of any of aspects 1-6, wherein determining whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 9. The method of any of aspects 1-6, wherein determining whether the position estimate for the terminal will be improved using the GNSS signals and the differential corrections relative to using the GNSS signals without the differential corrections is based on environmental conditions of a current position of the terminal.

Aspect 10. A terminal configured for positioning, comprising: a wireless transceiver configured to wirelessly communicate with entities in a wireless network; a Global Navigation Satellite System (GNSS) receiver; at least one memory; at least one processor coupled to the wireless transceiver, the GNSS receiver and the at least one memory, wherein the at least one processor is configured to: wirelessly connect, via the wireless transceiver, with a differential Global Navigation Satellite System (DGNSS) server to receive differential corrections generated by a reference station for GNSS signals; receive, via the GNSS receiver, GNSS signals from a plurality of GNSS satellite vehicles; receive, via the wireless transceiver, the differential corrections generated by the reference station that are broadcast by the DGNSS server; determine whether a position estimate for the terminal will be improved using the GNSS signals and the differential corrections relative to using the GNSS signals without the differential corrections; determine a position for the terminal based on the GNSS signals and the differential corrections in response to a determination that the position estimate for the terminal will be improved; and stop the use of differential corrections broadcast by the DGNSS server and determining the position for the terminal based on the GNSS signals without the differential corrections in response to a determination that the position estimate for the terminal will not be improved.

Aspect 11. The terminal of aspect 10, wherein the at least one processor is configured to stop the use of the differential corrections by being configured to continue to receive the differential corrections broadcast by the DGNSS server and not use the differential corrections for determining the position for the terminal.

Aspect 12. The terminal of aspect 10, wherein the at least one processor is configured to stop the use of the differential corrections by being configured to disconnect from the DGNSS server.

Aspect 13. The terminal of aspect 12, wherein the at least one processor is further configured to: after disconnecting from the DGNSS server, wirelessly reconnect, via the wireless transceiver, with the DGNSS server at a later time to receive the differential corrections; and determine the position for the terminal based on the GNSS signals and the differential corrections after wirelessly reconnecting with the DGNSS server.

Aspect 14. The terminal of aspect 13, wherein the at least one processor is configured to reconnect with the DGNSS server at the later time after a predetermined amount of time.

Aspect 15. The terminal of aspect 13, wherein the at least one processor is configured to reconnect with the DGNSS server at the later time by being configured to determine that the position estimate for the terminal will be improved using the GNSS signals and the differential corrections relative to using the GNSS signals without the differential corrections.

Aspect 16. The terminal of any of aspects 10-15, wherein the at least one processor is configured to determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 17. The terminal of any of aspects 10-15, wherein the at least one processor is configured to determine whether the position estimate for the terminal will be improved using the GNSS signals and the differential corrections relative to using the GNSS signals without the differential corrections based on a first position determined using the GNSS signals and the differential corrections and a second position determined using the GNSS signals without the differential corrections.

Aspect 18. The terminal of any of aspects 10-15, wherein the at least one processor is configured to determine whether the position estimate for the terminal will be improved using the GNSS signals and the differential corrections relative to using the GNSS signals without the differential corrections based on environmental conditions of a current position of the terminal.

Aspect 19. A terminal configured for positioning, comprising: means for wirelessly connecting with a differential Global Navigation Satellite System (DGNSS) server to receive differential corrections generated by a reference station for GNSS signals; means for receiving GNSS signals from a plurality of GNSS satellite vehicles; means for receiving the differential corrections generated by the reference station that are broadcast by the DGNSS server; means for determining whether a position estimate for the terminal will be improved using the GNSS signals and the differential corrections relative to using the GNSS signals without the differential corrections; means for determining a position for the terminal based on the GNSS signals and the differential corrections in response to a determination that the position estimate for the terminal will be improved; and means for stopping the use of differential corrections broadcast by the DGNSS server and determining the position for the terminal based on the GNSS signals without the differential corrections in response to a determination that the position estimate for the terminal will not be improved.

Aspect 20. The terminal of aspect 19, wherein the means for stopping the use of the differential corrections comprises means for continuing to receive the differential corrections broadcast by the DGNSS server and not using the differential corrections for determining the position for the terminal.

Aspect 21. The terminal of aspect 19, wherein the means for stopping the use of the differential corrections comprises means for disconnecting from the DGNSS server.

Aspect 22. The terminal of aspect 21, further comprising: means for after disconnecting from the DGNSS server, wirelessly reconnecting with the DGNSS server at a later time to receive the differential corrections; and means for determining the position for the terminal based on the GNSS signals and the differential corrections after wirelessly reconnecting with the DGNSS server.

Aspect 23. The terminal of aspect 22, wherein the means for reconnecting with the DGNSS server at the later time reconnects after a predetermined amount of time.

Aspect 24. The terminal of aspect 22, wherein means for reconnecting with the DGNSS server at the later time reconnects after determining that the position estimate for the terminal will be improved using the GNSS signals and the differential corrections relative to using the GNSS signals without the differential corrections.

Aspect 25. The terminal of any of aspects 19-24, wherein the means for determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 26. The terminal of any of aspects 19-24, wherein the means for determining whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 27. The terminal of any of aspects 19-24, wherein the means for determining whether the position estimate for the terminal will be improved using the GNSS signals and the differential corrections relative to using the GNSS signals without the differential corrections is based on environmental conditions of a current position of the terminal.

Aspect 28. A non-transitory computer readable storage medium including program code stored thereon, the program code is operable to configure at least one processor in a terminal for positioning, the program code comprising instructions to: wirelessly connect with a differential Global Navigation Satellite System (DGNSS) server to receive differential corrections generated by a reference station for GNSS signals; receive GNSS signals from a plurality of GNSS satellite vehicles; receive the differential corrections generated by the reference station that are broadcast by the DGNSS server; determine whether a position estimate for the terminal will be improved using the GNSS signals and the differential corrections relative to using the GNSS signals without the differential corrections; determine a position for the terminal based on the GNSS signals and the differential corrections in response to a determination that the position estimate for the terminal will be improved; and stop the use of differential corrections broadcast by the DGNSS server and determining the position for the terminal based on the GNSS signals without the differential corrections in response to a determination that the position estimate for the terminal will not be improved.

Aspect 29. The non-transitory computer readable storage medium of aspect 28, wherein the instructions to stop the use of the differential corrections comprises instructions to continue to receive the differential corrections broadcast by the DGNSS server and not use the differential corrections for determining the position for the terminal.

Aspect 30. The non-transitory computer readable storage medium of aspect 28, wherein the instructions to stop the use of the differential corrections comprises instructions to disconnect from the DGNSS server.

Aspect 31. The non-transitory computer readable storage medium of aspect 30, wherein the program code further comprises instructions to: after disconnecting from the DGNSS server, wirelessly reconnect with the DGNSS server at a later time to receive the differential corrections; and determine the position for the terminal based on the GNSS signals and the differential corrections after wirelessly reconnecting with the DGNSS server.

Aspect 32. The non-transitory computer readable storage medium of aspect 31, wherein the instructions to reconnect with the DGNSS server at the later time comprises instructions to reconnect after a predetermined amount of time.

Aspect 33. The non-transitory computer readable storage medium of aspect 31, wherein the instructions to reconnect with the DGNSS server at the later time comprises instructions to determine that the position estimate for the terminal will be improved using the GNSS signals and the differential corrections relative to using the GNSS signals without the differential corrections.

Aspect 34. The non-transitory computer readable storage medium of any of aspects 28-33, wherein instructions to determine whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 35. The non-transitory computer readable storage medium of any of aspects 28-33, wherein instructions to determine whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 36. The non-transitory computer readable storage medium of any of aspects 28-33, wherein instructions to determine whether the position estimate for the terminal will be improved using the GNSS signals and the differential corrections relative to using the GNSS signals without the differential corrections is based on environmental conditions of a current position of the terminal.

Aspect 37. A method performed by a differential Global Navigation Satellite System (DGNSS) server for positioning a terminal, the method comprising: connecting with the terminal to provide the terminal with differential corrections generated by a reference station for GNSS signals; receiving position information from the terminal comprising at least GNSS signals received by the terminal; receiving differential corrections generated by the reference station for the GNSS signals; determining whether a position estimate for the terminal will be improved using the GNSS signals and the differential corrections relative to using the GNSS signals without the differential corrections; broadcasting to the terminal the differential corrections generated by the reference station for the GNSS signals in response to a determination that the position estimate for the terminal will be improved; and sending to the terminal an indication to stop using the differential corrections in response to a determination that the position estimate for the terminal will not be improved.

Aspect 38. The method of aspect 37, wherein the indication to stop using the differential corrections comprises an indication to not use the differential corrections for determining a position for the terminal.

Aspect 39. The method of aspect 37, wherein the indication to stop using the differential corrections comprises an indication to disconnect from the DGNSS server.

Aspect 40. The method of any of aspects 37-39, further comprising sending with the indication to stop using the differential corrections an indication of an amount of time to delay before using the differential corrections.

Aspect 41. The method of any of aspects 37-40, further comprising sending to the terminal an indication to begin using the differential corrections again after sending the indication to stop using the differential corrections.

Aspect 42. The method of aspect 41, wherein the indication to begin using the differential corrections again is sent a predetermined amount of time after sending the indication to stop using the differential corrections.

Aspect 43. The method of aspect 41, wherein the indication to begin using the differential corrections again is sent after determining that the position estimate for the terminal will be improved using the GNSS signals and the differential corrections from the reference station relative to using the GNSS signals without the differential corrections.

Aspect 44. The method of any of aspects 37-43, wherein determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 45. The method of any of aspects 37-43, wherein determining whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 46. The method of any of aspects 37-43, wherein determining whether the position estimate for the terminal will be improved using the GNSS signals and the differential corrections relative to using the GNSS signals without the differential corrections is based on environmental conditions of a current position of the terminal.

Aspect 47. A differential Global Navigation Satellite System (DGNSS) server configured for positioning a terminal, comprising: an external interface configured to wirelessly communicate with entities in a wireless network; at least one memory; at least one processor coupled to the external interface and the at least one memory, wherein the at least one processor is configured to: connect, via the external interface with the terminal to provide the terminal with differential corrections generated by a reference station for GNSS signals; receive, via the external interface, position information from the terminal comprising at least GNSS signals received by the terminal; receive, via the external interface, differential corrections generated by the reference station for the GNSS signals; determine whether a position estimate for the terminal will be improved using the GNSS signals and the differential corrections relative to using the GNSS signals without the differential corrections; broadcast, via the external interface, to the terminal the differential corrections generated by the reference station for the GNSS signals in response to a determination that the position estimate for the terminal will be improved; and send, via the external interface, to the terminal an indication to stop using the differential corrections in response to a determination that the position estimate for the terminal will not be improved.

Aspect 48. The DGNSS server of aspect 47, wherein the indication to stop using the differential corrections comprises an indication to not use the differential corrections for determining a position for the terminal.

Aspect 49. The DGNSS server of aspect 47, wherein the indication to stop using the differential corrections comprises an indication to disconnect from the DGNSS server.

Aspect 50. The DGNSS server of any of aspects 47-49, wherein the at least one processor is further configured to send with the indication to stop using the differential corrections an indication of an amount of time to delay before using the differential corrections.

Aspect 51. The DGNSS server of any of aspects 47-50, wherein the at least one processor is further configured to send to the terminal an indication to begin using the differential corrections again after sending the indication to stop using the differential corrections.

Aspect 52. The DGNSS server of aspect 51, wherein the indication to begin using the differential corrections again is sent a predetermined amount of time after sending the indication to stop using the differential corrections.

Aspect 53. The DGNSS server of aspect 51, wherein the indication to begin using the differential corrections again is sent after determining that the position estimate for the terminal will be improved using the GNSS signals and the differential corrections from the reference station relative to using the GNSS signals without the differential corrections.

Aspect 54. The DGNSS server of any of aspects 47-53, wherein the at least one processor is configured to determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 55. The DGNSS server of any of aspects 47-53, wherein the at least one processor is configured to determine whether the position estimate for the terminal will be improved using the GNSS signals and the differential corrections relative to using the GNSS signals without the differential corrections based on a first position determined using the GNSS signals and the differential corrections and a second position determined using the GNSS signals without the differential corrections.

Aspect 56. The DGNSS server of any of aspects 47-53, wherein the at least one processor is configured to determine whether the position estimate for the terminal will be improved using the GNSS signals and the differential corrections relative to using the GNSS signals without the differential corrections based on environmental conditions of a current position of the terminal.

Aspect 57. A differential Global Navigation Satellite System (DGNSS) server configured for positioning a terminal, comprising: means for connecting with the terminal to provide the terminal with differential corrections generated by a reference station for GNSS signals; means for receiving position information from the terminal comprising at least GNSS signals received by the terminal; means for receiving differential corrections generated by the reference station for the GNSS signals; means for determining whether a position estimate for the terminal will be improved using the GNSS signals and the differential corrections relative to using the GNSS signals without the differential corrections; means for broadcasting to the terminal the differential corrections generated by the reference station for the GNSS signals in response to a determination that the position estimate for the terminal will be improved; and means for sending to the terminal an indication to stop using the differential corrections in response to a determination that the position estimate for the terminal will not be improved.

Aspect 58. The DGNSS server of aspect 57, wherein the indication to stop using the differential corrections comprises an indication to not use the differential corrections for determining a position for the terminal.

Aspect 59. The DGNSS server of aspect 57, wherein the indication to stop using the differential corrections comprises an indication to disconnect from the DGNSS server.

Aspect 60. The DGNSS server of any of aspects 57-59, further comprising means for sending with the indication to stop using the differential corrections an indication of an amount of time to delay before using the differential corrections.

Aspect 61. The DGNSS server of any of aspects 57-60, further comprising means for sending to the terminal an indication to begin using the differential corrections again after sending the indication to stop using the differential corrections.

Aspect 62. The DGNSS server of aspect 61, wherein the indication to begin using the differential corrections again is sent a predetermined amount of time after sending the indication to stop using the differential corrections.

Aspect 63. The DGNSS server of aspect 61, wherein the indication to begin using the differential corrections again is sent after determining that the position estimate for the terminal will be improved using the GNSS signals and the differential corrections from the reference station relative to using the GNSS signals without the differential corrections.

Aspect 64. The DGNSS server of any of aspects 57-63, wherein the means for determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 65. The DGNSS server of any of aspects 57-63, wherein means for determining whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 66. The DGNSS server of any of aspects 57-63, wherein means for determining whether the position estimate for the terminal will be improved using the GNSS signals and the differential corrections relative to using the GNSS signals without the differential corrections is based on environmental conditions of a current position of the terminal.

Aspect 67. A non-transitory computer readable storage medium including program code stored thereon, the program code is operable to configure at least one processor in a differential Global Navigation Satellite System (DGNSS) server for positioning a terminal, the program code comprising instructions to: connect with the terminal to provide the terminal with differential corrections generated by a reference station for GNSS signals; receive position information from the terminal comprising at least GNSS signals received by the terminal; receive differential corrections generated by the reference station for the GNSS signals; determine whether a position estimate for the terminal will be improved using the GNSS signals and the differential corrections relative to using the GNSS signals without the differential corrections; broadcast to the terminal the differential corrections generated by the reference station for the GNSS signals in response to a determination that the position estimate for the terminal will be improved; and send to the terminal an indication to stop using the differential corrections in response to a determination that the position estimate for the terminal will not be improved.

Aspect 68. The non-transitory computer readable storage medium of aspect 67, wherein the indication to stop using the differential corrections comprises an indication to not use the differential corrections for determining a position for the terminal.

Aspect 69. The non-transitory computer readable storage medium of aspect 67, wherein the indication to stop using the differential corrections comprises an indication to disconnect from the DGNSS server.

Aspect 70. The non-transitory computer readable storage medium of any of aspects 67-69, wherein the program code further comprises instructions to send with the indication to stop using the differential corrections an indication of an amount of time to delay before using the differential corrections.

Aspect 71. The non-transitory computer readable storage medium of any of aspects 67-69, wherein the program code further comprises instructions to send to the terminal an indication to begin using the differential corrections again after sending the indication to stop using the differential corrections.

Aspect 72. The non-transitory computer readable storage medium of aspect 71, wherein the indication to begin using the differential corrections again is sent a predetermined amount of time after sending the indication to stop using the differential corrections.

Aspect 73. The non-transitory computer readable storage medium of aspect 71, wherein the indication to begin using the differential corrections again is sent after determining that the position estimate for the terminal will be improved using the GNSS signals and the differential corrections from the reference station relative to using the GNSS signals without the differential corrections.

Aspect 74. The non-transitory computer readable storage medium of any of aspects 67-73, wherein the instructions to determine whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

Aspect 75. The non-transitory computer readable storage medium of any of aspects 67-73, wherein the instructions to determine whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

Aspect 76. The non-transitory computer readable storage medium of any of aspects 67-73, wherein the instructions to determine whether the position estimate for the terminal will be improved using the GNSS signals and the differential corrections relative to using the GNSS signals without the differential corrections is based on environmental conditions of a current position of the terminal.

Aspect 77. A method performed by a terminal for positioning, the method comprising: wirelessly connecting with a differential Global Navigation Satellite System (DGNSS) server to receive differential corrections generated by a reference station for GNSS signals; receiving GNSS signals from a plurality of GNSS satellite vehicles; receiving the differential corrections generated by the reference station that are broadcast by the DGNSS server; sending to the DGNSS server position information comprising at least the GNSS signals; receiving from the DGNSS server an indication to stop using the differential corrections; and determining a position for the terminal based on the GNSS signals without the differential corrections.

Aspect 78. The method of aspect 77, wherein the indication to stop using the differential corrections comprises an indication to not use the differential corrections for determining the position for the terminal.

Aspect 79. The method of aspect 77, wherein the indication to stop using the differential corrections comprises an indication to disconnect from the DGNSS server, further comprising disconnecting from the DGNSS server.

Aspect 80. The method of aspect 79, further comprising: receiving additional GNSS signals from the plurality of GNSS satellite vehicles after disconnecting from the reference station; and sending to the DGNSS server position information comprising the additional GNSS signals.

Aspect 81. The method of any of aspects 77-80, wherein the indication to stop using the differential corrections is sent by the DGNSS server after the DGNSS server determines that position estimate for the terminal will not be improved using the GNSS signals and the differential corrections relative to using the GNSS signals without the differential corrections.

Aspect 82. The method of any of aspects 77-81, further comprising: receiving from the DGNSS server an indication of an amount of time to delay before using the differential corrections again with the indication to stop using the differential corrections; and using the differential corrections again after expiration of the amount of time.

Aspect 83. The method of any of aspects 77-81, further comprising: receiving from the DGNSS server an indication to begin using the differential corrections again after receiving the indication to stop using the differential corrections; and using the differential corrections again in response to the indication to begin using the differential corrections again.

Aspect 84. The method of aspect 83, wherein the indication to begin using the differential corrections again is sent by the DGNSS server a predetermined amount of time after the indication to stop using the differential corrections is sent.

Aspect 85. The method of aspect 83, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

Aspect 86. A terminal configured for positioning, comprising: a wireless transceiver configured to wirelessly communicate with entities in a wireless network; a Global Navigation Satellite System (GNSS) receiver; at least one memory; at least one processor coupled to the wireless transceiver, the GNSS receiver and the at least one memory, wherein the at least one processor is configured to: wirelessly connect, via the wireless transceiver, with a differential Global Navigation Satellite System (DGNSS) server to receive differential corrections generated by a reference station for GNSS signals; receive, via the GNSS receiver, GNSS signals from a plurality of GNSS satellite vehicles; receive, via the wireless transceiver, the differential corrections generated by the reference station that are broadcast by the DGNSS server; send, via the wireless transceiver, to the DGNSS server position information comprising at least the GNSS signals; receive, via the wireless transceiver, from the DGNSS server an indication to stop using the differential corrections; and determine a position for the terminal based on the GNSS signals without the differential corrections.

Aspect 87. The terminal of aspect 86, wherein the indication to stop using the differential corrections comprises an indication to not use the differential corrections for determining the position for the terminal.

Aspect 88. The terminal of aspect 86, wherein the indication to stop using the differential corrections comprises an indication to disconnect from the DGNSS server, further comprising disconnecting from the DGNSS server.

Aspect 89. The terminal of aspect 88, wherein the at least one processor is further configured to: receive, via the GNSS receiver, additional GNSS signals from the plurality of GNSS satellite vehicles after disconnecting from the reference station; and send, via the wireless transceiver, to the DGNSS server position information comprising the additional GNSS signals.

Aspect 90. The terminal of any of aspects 86-89, wherein the indication to stop using the differential corrections is sent by the DGNSS server after the DGNSS server determines that position estimate for the terminal will not be improved using the GNSS signals and the differential corrections relative to using the GNSS signals without the differential corrections.

Aspect 91. The terminal of any of aspects 86-90, wherein the at least one processor is further configured to: receive, via the wireless transceiver, from the DGNSS server an indication of an amount of time to delay before using the differential corrections again with the indication to stop using the differential corrections; and use the differential corrections again after expiration of the amount of time.

Aspect 92. The terminal of any of aspects 86-90, wherein the at least one processor is further configured to: receive, via the wireless transceiver, from the DGNSS server an indication to begin using the differential corrections again after receiving the indication to stop using the differential corrections; and use the differential corrections again in response to the indication to begin using the differential corrections again.

Aspect 93. The terminal of aspect 92, wherein the indication to begin using the differential corrections again is sent by the DGNSS server a predetermined amount of time after the indication to stop using the differential corrections is sent.

Aspect 94. The terminal of aspect 92, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

Aspect 95. A terminal configured for positioning, comprising: means for wirelessly connecting with a differential Global Navigation Satellite System (DGNSS) server to receive differential corrections generated by a reference station for GNSS signals; means for receiving GNSS signals from a plurality of GNSS satellite vehicles; means for receiving the differential corrections generated by the reference station that are broadcast by the DGNSS server; means for sending to the DGNSS server position information comprising at least the GNSS signals; means for receiving from the DGNSS server an indication to stop using the differential corrections; and means for determining a position for the terminal based on the GNSS signals without the differential corrections.

Aspect 96. The terminal of aspect 95, wherein the indication to stop using the differential corrections comprises an indication to not use the differential corrections for determining the position for the terminal.

Aspect 97. The terminal of aspect 95, wherein the indication to stop using the differential corrections comprises an indication to disconnect from the DGNSS server, further comprising disconnecting from the DGNSS server.

Aspect 98. The terminal of aspect 97, further comprising: means for receiving additional GNSS signals from the plurality of GNSS satellite vehicles after disconnecting from the reference station; and means for sending to the DGNSS server position information comprising the additional GNSS signals.

Aspect 99. The terminal of any of aspects 95-98, wherein the indication to stop using the differential corrections is sent by the DGNSS server after the DGNSS server determines that position estimate for the terminal will not be improved using the GNSS signals and the differential corrections relative to using the GNSS signals without the differential corrections.

Aspect 100. The terminal of any of aspects 95-99, further comprising: means for receiving from the DGNSS server an indication of an amount of time to delay before using the differential corrections again with the indication to stop using the differential corrections; and means for using the differential corrections again after expiration of the amount of time.

Aspect 101. The terminal of any of aspects 95-99, further comprising: means for receiving from the DGNSS server an indication to begin using the differential corrections again after receiving the indication to stop using the differential corrections; and means for using the differential corrections again in response to the indication to begin using the differential corrections again.

Aspect 102. The terminal of aspect 101, wherein the indication to begin using the differential corrections again is sent by the DGNSS server a predetermined amount of time after the indication to stop using the differential corrections is sent.

Aspect 103. The terminal of aspect 101, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

Aspect 104. A non-transitory computer readable storage medium including program code stored thereon, the program code is operable to configure at least one processor in a terminal for positioning, the program code comprising instructions to: wirelessly connect with a differential Global Navigation Satellite System (DGNSS) server to receive differential corrections generated by a reference station for GNSS signals; receive GNSS signals from a plurality of GNSS satellite vehicles; receive the differential corrections generated by the reference station that are broadcast by the DGNSS server; send to the DGNSS server position information comprising at least the GNSS signals; receive from the DGNSS server an indication to stop using the differential corrections; and determine a position for the terminal based on the GNSS signals without the differential corrections.

Aspect 105. The non-transitory computer readable storage medium of aspect 104, wherein the indication to stop using the differential corrections comprises an indication to not use the differential corrections for determining the position for the terminal.

Aspect 106. The non-transitory computer readable storage medium of aspect 104, wherein the indication to stop using the differential corrections comprises an indication to disconnect from the DGNSS server, further comprising disconnecting from the DGNSS server.

Aspect 107. The non-transitory computer readable storage medium of aspect 106, wherein the program code further comprises instructions to: receive additional GNSS signals from the plurality of GNSS satellite vehicles after disconnecting from the reference station; and send to the DGNSS server position information comprising the additional GNSS signals.

Aspect 108. The non-transitory computer readable storage medium of any of aspects 104-107, wherein the indication to stop using the differential corrections is sent by the DGNSS server after the DGNSS server determines that position estimate for the terminal will not be improved using the GNSS signals and the differential corrections relative to using the GNSS signals without the differential corrections.

Aspect 109. The non-transitory computer readable storage medium of any of aspects 104-108, wherein the program code further comprises instructions to: receive from the DGNSS server an indication of an amount of time to delay before using the differential corrections again with the indication to stop using the differential corrections; and use the differential corrections again after expiration of the amount of time.

Aspect 110. The non-transitory computer readable storage medium of any of aspects 104-108, wherein the program code further comprises instructions to: receive from the DGNSS server an indication to begin using the differential corrections again after receiving the indication to stop using the differential corrections; and use the differential corrections again in response to the indication to begin using the differential corrections again.

Aspect 111. The non-transitory computer readable storage medium of aspect 110, wherein the indication to begin using the differential corrections again is sent by the DGNSS server a predetermined amount of time after the indication to stop using the differential corrections is sent.

Aspect 112. The non-transitory computer readable storage medium of aspect 110, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

Aspect 113. A method performed by a differential Global Navigation Satellite System (DGNSS) server for positioning a terminal, the method comprising: receiving an indication of DGNSS capabilities from the terminal; selecting differential corrections generated by a reference station for GNSS signals based on the DGNSS capabilities of the terminal; and sending the selected differential corrections to the terminal.

Aspect 114. The method of aspect 113, wherein the DGNSS capabilities of the terminal comprises an indication of at least one of constellation, frequencies, or a combination thereof, that the terminal is capable of receiving GNSS signals.

Aspect 115. A differential Global Navigation Satellite System (DGNSS) server configured for positioning a terminal, comprising: an external interface configured to wirelessly communicate with entities in a wireless network; at least one memory; at least one processor coupled to the external interface and the at least one memory, wherein the at least one processor is configured to: receive, via the external interface, an indication of DGNSS capabilities from the terminal; select differential corrections generated by a reference station for GNSS signals based on the DGNSS capabilities of the terminal; and send, via the external interface, the selected differential corrections to the terminal.

Aspect 116. The DGNSS server of aspect 115, wherein the DGNSS capabilities of the terminal comprises an indication of at least one of constellation, frequencies, or a combination thereof, that the terminal is capable of receiving GNSS signals.

Aspect 117. A differential Global Navigation Satellite System (DGNSS) server configured for positioning a terminal, comprising: means for receiving an indication of DGNSS capabilities from the terminal; means for selecting differential corrections generated by a reference station for GNSS signals based on the DGNSS capabilities of the terminal; and means for sending the selected differential corrections to the terminal.

Aspect 118. The DGNSS server of aspect 117, wherein the DGNSS capabilities of the terminal comprises an indication of at least one of constellation, frequencies, or a combination thereof, that the terminal is capable of receiving GNSS signals.

Aspect 119. A non-transitory computer readable storage medium including program code stored thereon, the program code is operable to configure at least one processor in a differential Global Navigation Satellite System (DGNSS) server for positioning a terminal, the program code comprising instructions to: receive an indication of DGNSS capabilities from the terminal; select differential corrections generated by a reference station for GNSS signals based on the DGNSS capabilities of the terminal; and send the selected differential corrections to the terminal.

Aspect 120. The non-transitory computer readable storage medium of aspect 119, wherein the DGNSS capabilities of the terminal comprises an indication of at least one of constellation, frequencies, or a combination thereof, that the terminal is capable of receiving GNSS signals.

Aspect 121. A method performed by a terminal for positioning, the method comprising: sending an indication of Differential Global Navigation Satellite System (DGNSS) capabilities to a DGNSS server; and receiving selected differential corrections for GNSS signals from the DGNSS server, wherein the selected differential corrections are generated by a reference station for the GNSS signals and are selected based on the DGNSS capabilities of the terminal.

Aspect 122. The method of aspect 121, wherein the DGNSS capabilities of the terminal comprises an indication of at least one of constellation, frequencies, or a combination thereof, that the terminal is capable of receiving GNSS signals.

Aspect 123. A terminal configured for positioning, comprising: a wireless transceiver configured to wirelessly communicate with entities in a wireless network; at least one memory; at least one processor coupled to the wireless transceiver and the at least one memory, wherein the at least one processor is configured to: send, via the wireless transceiver, an indication of Differential Global Navigation Satellite System (DGNSS) capabilities to a DGNSS server; and receive, via the wireless transceiver, selected differential corrections for GNSS signals from the DGNSS server, wherein the selected differential corrections are generated by a reference station for the GNSS signals and are selected based on the DGNSS capabilities of the terminal.

Aspect 124. The terminal of aspect 123, wherein the DGNSS capabilities of the terminal comprises an indication of at least one of constellation, frequencies, or a combination thereof, that the terminal is capable of receiving GNSS signals.

Aspect 125. A terminal configured for positioning, comprising: means for sending an indication of Differential Global Navigation Satellite System (DGNSS) capabilities to a DGNSS server; and means for receiving selected differential corrections for GNSS signals from the DGNSS server, wherein the selected differential corrections are generated by a reference station for the GNSS signals and are selected based on the DGNSS capabilities of the terminal.

Aspect 126. The terminal of aspect 125, wherein the DGNSS capabilities of the terminal comprises an indication of at least one of constellation, frequencies, or a combination thereof, that the terminal is capable of receiving GNSS signals.

Aspect 127. A non-transitory computer readable storage medium including program code stored thereon, the program code is operable to configure at least one processor in a terminal for positioning, the program code comprising instructions to: send an indication of Differential Global Navigation Satellite System (DGNSS) capabilities to a DGNSS server; and receive selected differential corrections for GNSS signals from the DGNSS server, wherein the selected differential corrections are generated by a reference station for the GNSS signals and are selected based on the DGNSS capabilities of the terminal.

Aspect 128. The non-transitory computer readable storage medium of aspect 127, wherein the DGNSS capabilities of the terminal comprises an indication of at least one of constellation, frequencies, or a combination thereof, that the terminal is capable of receiving GNSS signals.

Therefore, it is intended that claimed subject matter not be limited to the particular examples disclosed, but that such claimed subject matter may also include all aspects falling within the scope of appended claims, and equivalents thereof.

What is claimed is:

1. A method performed by a terminal for positioning, the method comprising:

wirelessly connecting with a differential Global Navigation Satellite System (DGNSS) server to receive one or more differential corrections generated by a reference station for GNSS signals;

receiving GNSS signals from a plurality of GNSS satellite vehicles;

receiving differential corrections generated by the reference station that are broadcast by the DGNSS server;

determining whether a position estimate for the terminal will be improved using the GNSS signals and the differential corrections relative to using the GNSS signals without the differential corrections based on a first position determined using the GNSS signals and the differential corrections and a second position determined using the GNSS signals without the differential corrections;

determining a position for the terminal based on the GNSS signals and the differential corrections in response to a determination that the position estimate for the terminal will be improved; and stopping the use of differential corrections broadcast by the DGNSS server and determining the position for the terminal based on the GNSS signals without the differential corrections in response to a determination that the position estimate for the terminal will not be improved.

2. The method of claim 1, wherein stopping the use of the differential corrections comprises continuing to receive the differential corrections broadcast by the DGNSS server and not using the differential corrections for determining the position for the terminal.

3. The method of claim 1, wherein stopping the use of the differential corrections comprises disconnecting from the DGNSS server.

4. The method of claim 3, further comprising:

after disconnecting from the DGNSS server, wirelessly reconnecting with the DGNSS server at a later time to receive the differential corrections; and determining the position for the terminal based on the GNSS signals and the differential corrections after wirelessly reconnecting with the DGNSS server.

5. The method of claim 4, wherein reconnecting with the DGNSS server at the later time is performed after a predetermined amount of time.

6. The method of claim 4, wherein reconnecting with the DGNSS server at the later time is performed after determining that the position estimate for the terminal will be improved using the GNSS signals and the differential corrections relative to using the GNSS signals without the differential corrections.

7. The method of claim 1, wherein determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

8. The method of claim 1, wherein determining whether the position estimate for the terminal will be improved using the GNSS signals and the differential corrections relative to using the GNSS signals without the differential corrections is further based on environmental conditions of a current position of the terminal.

9. A terminal configured for positioning, comprising:

a wireless transceiver configured to wirelessly communicate with entities in a wireless network;

a Global Navigation Satellite System (GNSS) receiver;

at least one memory;

at least one processor coupled to the wireless transceiver, the GNSS receiver and the at least one memory, wherein the at least one processor is configured to:

wirelessly connect, via the wireless transceiver, with a differential Global Navigation Satellite System (DGNSS) server to receive one or more differential corrections generated by a reference station for GNSS signals;

receive, via the GNSS receiver, GNSS signals from a plurality of GNSS satellite vehicles;

receive, via the wireless transceiver, differential corrections generated by the reference station that are broadcast by the DGNSS server;

determine whether a position estimate for the terminal will be improved using the GNSS signals and the differential corrections relative to using the GNSS signals without the differential corrections based on a first position determined using the GNSS signals and the differential corrections and a second position determined using the GNSS signals without the differential corrections;

determine a position for the terminal based on the GNSS signals and the differential corrections in response to a determination that the position estimate for the terminal will be improved; and stop the use of differential corrections broadcast by the DGNSS server and determining the position for the terminal based on the GNSS signals without the differential corrections in response to a determination that the position estimate for the terminal will not be improved.

10. The terminal of claim 9, wherein the at least one processor is configured to stop the use of the differential corrections by being configured to continue to receive the differential corrections broadcast by the DGNSS server and not use the differential corrections for determining the position for the terminal.

11. The terminal of claim 9, wherein the at least one processor is configured to stop the use of the differential corrections by being configured to disconnect from the DGNSS server.

12. The terminal of claim 11, wherein the at least one processor is further configured to:

after disconnecting from the DGNSS server, wirelessly reconnect, via the wireless transceiver, with the DGNSS server at a later time to receive the differential corrections; and determine the position for the terminal based on the GNSS signals and the differential corrections after wirelessly reconnecting with the DGNSS server.

13. The terminal of claim 12, wherein the at least one processor is configured to reconnect with the DGNSS server at the later time after a predetermined amount of time.

14. The terminal of claim 12, wherein the at least one processor is configured to reconnect with the DGNSS server at the later time by being configured to determine that the position estimate for the terminal will be improved using the GNSS signals and the differential corrections relative to using the GNSS signals without the differential corrections.

15. The terminal of claim 9, wherein the at least one processor is configured to determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

16. The terminal of claim 9, wherein the at least one processor is configured to determine whether the position estimate for the terminal will be improved using the GNSS signals and the differential corrections relative to using the GNSS signals without the differential corrections is further based on environmental conditions of a current position of the terminal.

17. A method performed by a differential Global Navigation Satellite System (DGNSS) server for positioning a terminal, the method comprising:

connecting with the terminal to provide the terminal with differential corrections generated by a reference station for GNSS signals;

receiving position information from the terminal comprising at least GNSS signals received by the terminal;

receiving differential corrections generated by the reference station for the GNSS signals;

determining whether a position estimate for the terminal will be improved using the GNSS signals and the differential corrections relative to using the GNSS signals without the differential corrections;

broadcasting to the terminal the differential corrections generated by the reference station for the GNSS signals in response to a determination that the position estimate for the terminal will be improved; and sending to the terminal an indication to stop using the differential corrections in response to a determination that the position estimate for the terminal will not be improved.

18. The method of claim 17, wherein the indication to stop using the differential corrections comprises an indication to not use the differential corrections for determining a position for the terminal.

19. The method of claim 17, wherein the indication to stop using the differential corrections comprises an indication to disconnect from the DGNSS server.

20. The method of claim 17, further comprising sending with the indication to stop using the differential corrections an indication of an amount of time to delay before using the differential corrections.

21. The method of claim 17, further comprising sending to the terminal an indication to begin using the differential corrections again after sending the indication to stop using the differential corrections.

22. The method of claim 21, wherein the indication to begin using the differential corrections again is sent a predetermined amount of time after sending the indication to stop using the differential corrections.

23. The method of claim 21, wherein the indication to begin using the differential corrections again is sent after determining that the position estimate for the terminal will be improved using the GNSS signals and the differential corrections from the reference station relative to using the GNSS signals without the differential corrections.

24. The method of claim 17, wherein determining whether the position estimate for the terminal will be improved using the GNSS signals and the differential corrections relative to using the GNSS signals without the differential corrections is based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

25. The method of claim 17, wherein determining whether the position estimate for the terminal will be improved using the GNSS signals and the differential corrections relative to using the GNSS signals without the differential corrections is based on a first position determined using the GNSS signals and the differential corrections and a second position determined using the GNSS signals without the differential corrections.

26. The method of claim 17, wherein determining whether the position estimate for the terminal will be improved using the GNSS signals and the differential corrections relative to using the GNSS signals without the differential corrections is based on environmental conditions of a current position of the terminal.

27. A differential Global Navigation Satellite System (DGNSS) server configured for positioning a terminal, comprising:

- an external interface configured to wirelessly communicate with entities in a wireless network;
- at least one memory;
- at least one processor coupled to the external interface and the at least one memory, wherein the at least one processor is configured to:
- connect, via the external interface with the terminal to provide the terminal with differential corrections generated by a reference station for GNSS signals;
- receive, via the external interface, position information from the terminal comprising at least GNSS signals received by the terminal;
- receive, via the external interface, differential corrections generated by the reference station for the GNSS signals;
- determine whether a position estimate for the terminal will be improved using the GNSS signals and the differential corrections relative to using the GNSS signals without the differential corrections;
- broadcast, via the external interface, to the terminal the differential corrections generated by the reference station for the GNSS signals in response to a determination that the position estimate for the terminal will be improved; and
- send, via the external interface, to the terminal an indication to stop using the differential corrections in response to a determination that the position estimate for the terminal will not be improved.

28. The DGNSS server of claim 27, wherein the indication to stop using the differential corrections comprises an indication to not use the differential corrections for determining a position for the terminal.

29. The DGNSS server of claim 27, wherein the indication to stop using the differential corrections comprises an indication to disconnect from the DGNSS server.

30. The DGNSS server of claim 27, wherein the at least one processor is further configured to send, with the indication to stop using the differential corrections, an indication of an amount of time to delay before using the differential corrections.

31. The DGNSS server of claim 27, wherein the at least one processor is further configured to send to the terminal an indication to begin using the differential corrections again after sending the indication to stop using the differential corrections.

32. The DGNSS server of claim 31, wherein the indication to begin using the differential corrections again is sent a predetermined amount of time after sending the indication to stop using the differential corrections.

33. The DGNSS server of claim 31, wherein the indication to begin using the differential corrections again is sent after determining that the position estimate for the terminal will be improved using the GNSS signals and the differential corrections from the reference station relative to using the GNSS signals without the differential corrections.

34. The DGNSS server of claim 27, wherein the at least one processor is configured to determine whether the position estimate for the terminal will be improved using the GNSS signals and the differential corrections relative to using the GNSS signals without the differential corrections based on at least one of a distance between the terminal and the reference station, a determination that the terminal is located in a tunnel, garage, or indoors, an indication of multipath components in the GNSS signals, an indication of signal jamming of the GNSS signals, an indication of a signal to noise ratio of the GNSS signals, or a combination thereof.

35. The DGNSS server of claim 27, wherein the at least one processor is configured to determine whether the position estimate for the terminal will be improved using the GNSS signals and the differential corrections relative to using the GNSS signals without the differential corrections based on a first position determined using the GNSS signals and the differential corrections and a second position determined using the GNSS signals without the differential corrections.

36. The DGNSS server of claim 27, wherein the at least one processor is configured to determine whether the position estimate for the terminal will be improved using the GNSS signals and the differential corrections relative to using the GNSS signals without the differential corrections based on environmental conditions of a current position of the terminal.

37. A method performed by a terminal for positioning, the method comprising:

- wirelessly connecting with a differential Global Navigation Satellite System (DGNSS) server to receive one or more differential corrections generated by a reference station for GNSS signals;
- receiving GNSS signals from a plurality of GNSS satellite vehicles;
- receiving differential corrections generated by the reference station that are broadcast by the DGNSS server;
- sending to the DGNSS server position information comprising at least the GNSS signals;
- receiving from the DGNSS server an indication to stop using the differential corrections after a determination that position estimate for the terminal will not be improved using the GNSS signals and the differential corrections relative to using the GNSS signals without the differential corrections; and
- determining a position for the terminal based on the GNSS signals without the differential corrections.

38. The method of claim 37, wherein the indication to stop using the differential corrections comprises an indication to not use the differential corrections for determining the position for the terminal.

39. The method of claim 37, wherein the indication to stop using the differential corrections comprises an indication to disconnect from the DGNSS server, further comprising disconnecting from the DGNSS server.

40. The method of claim 39, further comprising:

receiving additional GNSS signals from the plurality of GNSS satellite vehicles after disconnecting from the reference station; and sending to the DGNSS server position information comprising the additional GNSS signals.

41. The method of claim 37, further comprising:

receiving from the DGNSS server an indication of an amount of time to delay before using the differential corrections again with the indication to stop using the differential corrections; and using the differential corrections again after expiration of the amount of time.

42. The method of claim 37, further comprising:

receiving from the DGNSS server an indication to begin using the differential corrections again after receiving the indication to stop using the differential corrections; and using the differential corrections again in response to the indication to begin using the differential corrections again.

43. The method of claim 42, wherein the indication to begin using the differential corrections again is sent by the DGNSS server a predetermined amount of time after the indication to stop using the differential corrections is sent.

44. The method of claim 42, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

45. A terminal configured for positioning, comprising:

a wireless transceiver configured to wirelessly communicate with entities in a wireless network;

a Global Navigation Satellite System (GNSS) receiver;

at least one memory;

at least one processor coupled to the wireless transceiver, the GNSS receiver and the at least one memory, wherein the at least one processor is configured to:

wirelessly connect, via the wireless transceiver, with a differential Global Navigation Satellite System (DGNSS) server to receive one or more differential corrections generated by a reference station for GNSS signals;

receive, via the GNSS receiver, GNSS signals from a plurality of GNSS satellite vehicles;

receive, via the wireless transceiver, differential corrections generated by the reference station that are broadcast by the DGNSS server;

send, via the wireless transceiver, to the DGNSS server position information comprising at least the GNSS signals;

receive, via the wireless transceiver, from the DGNSS server an indication to stop using the differential corrections after a determination that position estimate for the terminal will not be improved using the GNSS signals and the differential corrections relative to using the GNSS signals without the differential corrections; and determine a position for the terminal based on the GNSS signals without the differential corrections.

46. The terminal of claim 45, wherein the indication to stop using the differential corrections comprises an indication to not use the differential corrections for determining the position for the terminal.

47. The terminal of claim 45, wherein the indication to stop using the differential corrections comprises an indication to disconnect from the DGNSS server, further comprising disconnecting from the DGNSS server.

48. The terminal of claim 47, wherein the at least one processor is further configured to:

receive, via the GNSS receiver, additional GNSS signals from the plurality of GNSS satellite vehicles after disconnecting from the reference station; and send, via the wireless transceiver, to the DGNSS server position information comprising the additional GNSS signals.

49. The terminal of claim 45, wherein the at least one processor is further configured to:

receive, via the wireless transceiver, from the DGNSS server an indication of an amount of time to delay before using the differential corrections again with the indication to stop using the differential corrections; and use the differential corrections again after expiration of the amount of time.

50. The terminal of claim 45, wherein the at least one processor is further configured to:

receive, via the wireless transceiver, from the DGNSS server an indication to begin using the differential corrections again after receiving the indication to stop using the differential corrections; and use the differential corrections again in response to the indication to begin using the differential corrections again.

51. The terminal of claim 50, wherein the indication to begin using the differential corrections again is sent by the DGNSS server a predetermined amount of time after the indication to stop using the differential corrections is sent.

52. The terminal of claim 50, wherein the indication to begin using the differential corrections again is sent by the DGNSS server after the DGNSS server determines that position estimate for the terminal will be improved using the GNSS signals and the differential corrections from the reference station relative to using the GNSS signals without the differential corrections.

* * * * *